US012137276B2

(12) United States Patent
Kim et al.

(10) Patent No.: US 12,137,276 B2
(45) Date of Patent: *Nov. 5, 2024

(54) PERSONALIZED SENSITIVITY MEASUREMENTS AND PLAYBACK FACTORS FOR ADAPTIVE AND PERSONALIZED MEDIA CODING AND DELIVERY

(71) Applicant: Dolby Laboratories Licensing Corporation, San Francisco, CA (US)

(72) Inventors: Doh-Suk Kim, Cupertino, CA (US); Sean Thomas McCarthy, San Francisco, CA (US); Scott Daly, Kalama, WA (US); Jeffrey Riedmiller, Novato, CA (US); Ludovic Christophe Malfait, Belmont, CA (US); Raphael Marc Ullmann, Basel (CH); Jason Michael Cloud, Clayton, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,251

(22) Filed: Nov. 16, 2023

(65) Prior Publication Data
US 2024/0155207 A1 May 9, 2024

Related U.S. Application Data

(63) Continuation of application No. 17/632,465, filed as application No. PCT/US2020/044241 on Jul. 30, 2020, now Pat. No. 11,863,839.
(Continued)

(51) Int. Cl.
H04N 21/647 (2011.01)
H04L 65/80 (2022.01)
(Continued)

(52) U.S. Cl.
CPC ....... H04N 21/64769 (2013.01); H04L 65/80 (2013.01); H04N 21/2668 (2013.01); H04N 21/4532 (2013.01)

(58) Field of Classification Search
CPC ......... H04N 21/64769; H04N 21/2668; H04N 21/4532; H04N 21/4854; H04N 21/6379;
(Continued)

(56) References Cited

U.S. PATENT DOCUMENTS 6,853,982 B2   2/2005   Smith
9,159,116 B2   10/2015  Plagemann
(Continued)

FOREIGN PATENT DOCUMENTS

EP   2805523 B1   3/2019
JP   201165652    3/2011
(Continued)

OTHER PUBLICATIONS

Zhao et al., "QoE Prediction Model with Personalized Parameters in IPTV Domain", IEEE Conferences May 2019, IEEE International Conference on Consumer Electronics—Taiwan (ICCE-TW) (pp. 1-2) (Year: 2019).
(Continued)

Primary Examiner — Oanh Duong

(57) ABSTRACT

A method for delivering media to a playback device including outputting first test media to be viewed by a first user. The method further includes receiving a first user input related to a first perception of the first test media by the first user and indicating a first personalized quality of experience of the first user with respect to the first test media. The method further includes generating a first personalized sensitivity profile including one or more viewing characteristics of the first user based on the first user input, and determining, based at least in part on the first personalized sensitivity
(Continued)

profile, a first media parameter. The first media parameter is determined in order to increase an efficiency of media delivery to the first playback device over a network while preserving the first personalized quality of experience of the first user.

21 Claims, 15 Drawing Sheets

Related U.S. Application Data

(60) Provisional application No. 63/056,942, filed on Jul. 27, 2020, provisional application No. 62/882,068, filed on Aug. 2, 2019.

(51) Int. Cl.
*H04N 21/2668* (2011.01)
*H04N 21/45* (2011.01)

(58) Field of Classification Search
CPC ............ H04N 21/85403; H04L 65/80; H04L 65/1059; H04L 65/612; H04L 65/613; H04L 67/306; G06F 16/435; G06F 16/9535
See application file for complete search history.

(56) References Cited

U.S. PATENT DOCUMENTS

| | | | |
|---|---|---|---|
| 9,398,347 B2 | 7/2016 | Jadallah | |
| 9,626,695 B2 | 4/2017 | Balasubramanian | |
| 9,715,863 B2 | 7/2017 | Rakow | |
| 10,200,436 B2 | 2/2019 | Funge | |
| 11,863,839 B2* | 1/2024 | Kim | H04L 65/613 |
| 2010/0186031 A1 | 7/2010 | Pradeep | |
| 2012/0011442 A1 | 1/2012 | Fay | |
| 2013/0297743 A1 | 11/2013 | Eschet | |
| 2015/0326903 A1* | 11/2015 | Reibman | H04N 21/234372 |
| | | | 725/116 |
| 2016/0182594 A1* | 6/2016 | White | H04L 65/61 |
| | | | 709/219 |
| 2017/0163709 A1* | 6/2017 | Owen | H04L 65/70 |
| 2017/0186019 A1 | 6/2017 | Loeb | |
| 2018/0077210 A1 | 3/2018 | Hannuksela | |
| 2018/0288454 A1 | 10/2018 | Sridhar | |
| 2019/0037002 A1 | 1/2019 | Arunachalam | |
| 2019/0082233 A1* | 3/2019 | Love | H04N 21/21805 |

FOREIGN PATENT DOCUMENTS

| | | |
|---|---|---|
| WO | 2015106557 A1 | 7/2015 |
| WO | 2016205697 A1 | 12/2016 |
| WO | 2018087275 A1 | 5/2018 |

OTHER PUBLICATIONS

Oshima et al., "A Study on Two-View Hybrid Image Generation," ACM Transactions on Graphics, Association for Computing Machinery, Jul. 1, 2006, Issue 3, vol. 25, pp. 527-532.

Oshima et al., "A Study on Two-View Hybrid Image Generation," The Institute of Electrical Engineers of Japan Study Material, The Institute of Electrical Engineers of Japan, Nov. 10, 2018, IS-18-058, pp. 41-44.

* cited by examiner

PERSONALIZED SENSITIVITY MEASUREMENTS AND PLAYBACK FACTORS FOR ADAPTIVE AND PERSONALIZED MEDIA CODING AND DELIVERY

CROSS-REFERENCE TO RELATED APPLICATIONS

This application is a continuation of U.S. patent application Ser. No. 17/632,465, filed Feb. 2, 2022, which is a national stage entry of International Application No. PCT/US2020/044241, which claims the benefit of U.S. Provisional Patent Application No. 63/056,942, filed Jul. 27, 2020 and U.S. Provisional Patent Application No. 62/882,068, filed Aug. 2, 2019, the content of all of which is hereby incorporated by reference in its entirety.

FIELD OF THE INVENTION

This application relates generally to delivery of visual media over a network to user devices for display of the visual media by the user devices for viewing by a user.

SUMMARY

Various aspects of the present disclosure relate to devices, systems, and methods to provide personalized and adaptive media coding and delivery based on playback-side information that is often collected without individual sensors.

In one aspect of the present disclosure, there is provided a method for delivering media to a playback device. The method may include outputting, with a first playback device and during a first test measurement session, first test media to be viewed by a first user. The method may further include receiving a first user input from the first user. The first user input may be related to a first perception of the first test media by the first user and may indicate a first personalized quality of experience of the first user with respect to the first test media. The method may further include generating, with one or more electronic processors, a first personalized sensitivity profile including one or more viewing characteristics of the first user based on the first user input. The method may further include determining, with the one or more electronic processors and based at least in part on the first personalized sensitivity profile, a first media parameter. The first media parameter may be determined in order to increase an efficiency of media delivery to the first playback device over a network while preserving the first personalized quality of experience of the first user. The method may further include providing, over the network, first output media to the first playback device in accordance with the first media parameter. The first output media may be configured to be output with the first playback device.

In another aspect of the present disclosure, there is provided an electronic computing device that may include a first playback device including a display. The display may be configured to output media to a first user. The electronic computing device may also include one or more electronic processors communicatively coupled to the display. The one or more electronic processors may be configured to output, with the first playback device and during a first test measurement session, first test media to be viewed by the first user. The one or more electronic processors may be further configured to receive a first user input from the first user. The first user input may be related to a first perception of the first test media by the first user and may indicate a first personalized quality of experience of the first user with respect to the first test media. The one or more electronic processors may be further configured to generate a first personalized sensitivity profile including one or more viewing characteristics of the first user based on the first user input. The one or more electronic processors may be further configured to determine, based at least in part on the first personalized sensitivity profile, a first media parameter. The first media parameter may be determined in order to increase an efficiency of media delivery to the first playback device over a network while preserving the first personalized quality of experience of the first user. The one or more electronic processors may be further configured to provide, over the network, first output media to the first playback device in accordance with the first media parameter. The first output media may be configured to be output with the first playback device.

In another aspect of the present disclosure, there is provided a method for displaying a hybrid image on a playback device. The method may include determining, with one or more electronic processors of an electronic computing device, a first value of a media parameter supported by a media server and a network configured to stream media. The method may further include determining, with the one or more electronic processors, a second value of the media parameter supported by the media server and the network. The method may further include at least one of generating and selecting, with the one or more electronic processors, the hybrid image based on the first value of the media parameter and the second value of the media parameter such that the hybrid image includes a first interpretation corresponding to the first value of the media parameter and a second interpretation corresponding to the second value of the media parameter. The method may further include displaying, on a display of the playback device, the hybrid image.

Other aspects of the embodiments will become apparent by consideration of the detailed description and accompanying drawings.

DETAILED DESCRIPTION

Figure 1:
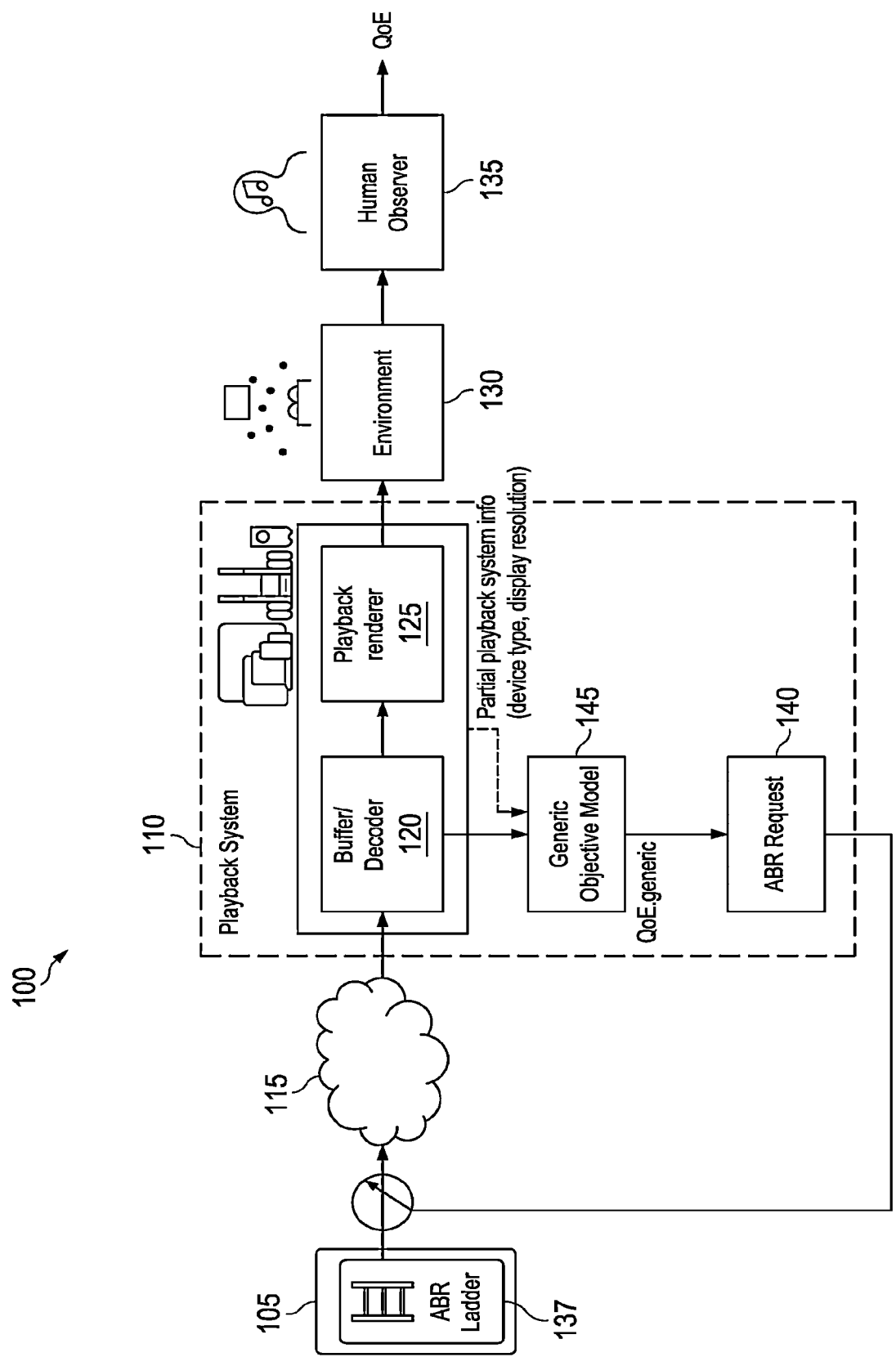
FIG. 1 illustrates an example adaptive bit rate (ABR) based media coding and delivery system according to embodiments described herein.

Visual media (e.g., images, videos, etc.) is deliverable via one or more communication networks to many different types of playback systems/devices (e.g., televisions, computers, tablets, smart phones, and the like) to be viewed by a user. In the visual media delivery chain, adaptive bit rate (ABR) streaming allows for improved network resource management through adaptive selection of bit rate and resolution on a media ladder based on network conditions, playback buffer status, shared network capacity, and other factors influenced by the network. Besides ABR streaming, other media delivery methods (which also may include coding methods or source coding methods) may similarly be used to control one or more media parameters of an upstream video encoder/transcoder/transrater such as bit rate, frame rate, resolution, etc.

However, up to this point, media delivery methods such as ABR streaming have not taken into account additional factors to further improve network resource management such as factors associated with playback systems/devices, with users' viewing capabilities, and with the environment in which the user is viewing the visual media. Rather, these factors are usually assumed to be ideal and uniform across different users/environments when performing content processing, coding, delivery, decoding and post-processing even though there exists a diverse range of viewing conditions and variation in human visual performance that greatly affect a viewer's actual quality of experience (QoE).

For example, short-distance viewing can make users more sensitive in distinguishing between low- and high-resolution video content. Also, different viewers can have different visual sensitivity because of factors including but not limited to refractive error (even when wearing corrective lenses), accumulation of floaters in the vitreous humor, age-related changes in color absorption by the lens, cataracts, or macular degeneration. For example, contrast sensitivity of a user/viewer may decrease due to increased refractive error, increased disease, and/or increased age. Additionally, an individual's personal QoE can change from place to place and from time to time, especially in mobile environments.

Detection of these visual sensitivity factors for each user/viewer can help estimate personalized QoE in real-world end-to-end systems and provide opportunities for improving QoE and further improving media delivery efficiency. For example, a media delivery system can save bandwidth by transmitting a custom filtered version of the same video to match a user's/viewer's visual acuity or viewing distance from a television while maintaining personalized QoE of each user/viewer.

Several works have proposed to collect playback-side factors using a variety of sensors, aiming at selecting optimal bit rate and resolution in media streaming, or feeding the information back to the media preprocessing, encoding and post-processing. However, the approach of using a variety of sensors to collect playback-side information is insufficient and impractical for many playback systems (e.g., television). It is insufficient because such sensors do not measure a user's innate visual acuity or sensitivity. It is impractical because it is overly burdensome to motivate and coordinate with television manufacturers across the entire consumer display industry to equip televisions with the required sensors and metadata protocols. While this burden is less for mobile devices which have many available sensors already, user privacy remains a concern, specifically when sensors collect visual information about the users. Another issue with existing approaches that utilize sensors to collect playback-side information is that different models/brands of televisions have their own proprietary upscaling and post-processing algorithms, and users may adjust various television settings such as brightness, contrast, or motion smoothing to suit their preference.

To address the above-noted technical problems, the methods, devices, and systems described herein include a new mechanism or protocol to share parameters related to playback device characteristics and personalized visual-sensitivity factors with the upstream devices configured to control the transmission of visual media to the playback devices. The methods, devices, and systems described herein provide personalized and adaptive media delivery based on collected playback-side information often without using individual sensors. Additionally, the collected playback-side information may be indicative of personalized QoE for different users and/or different viewing environments. The methods, devices, and systems described herein further improve network resource management/media delivery efficiency while maintaining personalized QoE for each user.

FIG. 1 illustrates an example adaptive bit rate (ABR) based media coding and delivery system 100. The system 100 includes a media server 105 that provides media to a playback system 110 (i.e., playback device) over a network 115. Although FIG. 1 shows a single playback system 110, the media server 105 may be configured to simultaneously stream the same or different media to additional playback systems 110.

The playback system 110 may include many different types of playback systems such as a television, a tablet, a smart phone, a computer, and the like. In some embodiments, the playback system 110 includes a buffer/decoder 120 and a playback renderer 125. The buffer/decoder 120 may receive media from the server 105 over the network 115. The buffer/decoder 120 may buffer the received media and decode the received media to be output by the playback renderer 125. The buffer/decoder 120 may include an electronic processor of the playback system 110 (e.g., a microprocessor, a microcontroller, or other suitable processing device) as described in further detail below with respect to FIG. 7. The playback renderer 125 may include an output device configured to display images and/or video. For example, the playback renderer 125 includes a light emitting diode (LED) display and/or a touch screen display as described in further detail below with respect to FIG. 7. The playback system 110 is located in an environment 130. A user 135 is also located in the environment 130 and may view media that is output by the playback system 110.

As illustrated in FIG. 1, in some embodiments, the media server 105 includes an ABR ladder 137 that is implemented by an electronic processor of the media server 105. In some embodiments, the media server 105 receives one or more ABR requests 140 from the playback system 110 to adjust a bit rate/quality decision of ABR streaming of media from the media server 105 to the playback system 110 over the network 115. For example, the playback system 110 may retrieve and/or utilize a stored generic objective model 145 (e.g., device type, display resolution, GEO-based startup resolution, or more comprehensive models such as ITU-T P.1203, etc.) from a memory and use the generic objective model 145 to monitor/measure streaming session and playback-related performance information such as network connectivity metrics, media player buffer status, codec, bit rate, initial loading delay and stalling events, and the like together with playback device 110 information such as display resolution, screen size, playback device type, and the like. In some embodiments, packet header information and partial/complete bitstream parsing may also be used to gather streaming session and playback-related performance information. The streaming and playback information is used to generate a generic quality of experience (QoE) estimation of the media streaming and playback of media. This QoE estimation may be used by the playback system 110 to influence the ABR request 140. For example, the playback system 110 periodically determines each ABR request 140 for media segments based on a locally generated bandwidth estimate, buffer size, round-trip time, etc. with a goal of maintaining seamless playback. In other words, the generic objective model 145 may be configured to allow the playback system 210 to control media streaming based on at least one of resource availability of the network 115 and playback system parameters.

In some cases, playback systems 110 will simultaneously request two or more segments representing the same time period in the media but encoded at different bit rates of the ABR ladder 137. Such a strategy may be inefficient and often leads to the playback system 110 requesting more data than it needs for seamless playback. Such a strategy may also lead to the playback system 110 requesting a resolution/bit rate/frame rate combination from the ABR ladder 137 that provides higher quality media that cannot be perceived by the user 135. In other words, existing ABR-selection logic attempting to increase the delivered resolution/bit rate/frame rate beyond a sensitivity threshold of the user 135 does not translate to increased QoE for the user 135. In addition to not translating to increased QoE for the user 135, the requested resolution/bit rate/frame rate combination may use more network resources (e.g., more bandwidth) and/or may cost the user 135 additional money (e.g., if the service provider of the media server 105 charges based on the amount of data provided to the playback system 110).

The above-noted problems of existing ABR-selection logic are caused by the generic objective model 145 not taking into account personalized QoE when determining ABR requests 140. For example, the generic objective model 145 may not take into account individualized/personalized viewing characteristics such as the lighting in the environment 130, a viewing distance of the user 135 (i.e., the distance between the user 135 and the playback renderer 125), vision sensitivities and capabilities of the eyes of the user 135 based on, for example, spatial frequency, and the like. Rather, existing ABR-selection techniques assume that these characteristics are the same for each environment 130 and for each user 135 when, in fact, these characteristics may vary greatly between environments and/or users and impact the QoE of the user 135 to perceive media being displayed by the playback system 110.

While FIG. 1 and its corresponding explanation refer to the ABR ladder 137 and ABR-selection techniques, ABR-related media delivery is merely an example meant to represent general media delivery methods that may be implemented by upstream devices such as the media server 105 and the network 115. The ABR ladder 137 and ABR-selection techniques are also used as an example media delivery method throughout this application with respect to additional figures (see, e.g., FIGS. 2, 3, and 11A-11B). However, the features disclosed herein may apply to any one of a number of different media delivery methods (which also may include coding methods or source coding methods) that are not based on the ABR ladder 137 or ABR-selection techniques. In other words, the features described herein may be used in conjunction with other media delivery methods besides ABR streaming that may similarly be used to control any media parameters of an upstream video encoder/transcoder/transrater such as bit rate, frame rate, resolution, etc. Additionally or alternatively, the features described herein may be used in conjunction with coding methods or source coding methods that are used to code/process media before the media is streamed. These coding methods and source coding methods may be generally be referred to as media delivery methods herein. In some embodiments, a media parameter includes a parameter that affects media delivery from the media server 105 to the playback system 210 (see FIGS. 2, 3, and 6) over the network 115 (i.e., an upstream media parameter). In some embodiments, a media parameter additionally or alternatively includes a playback system parameter (i.e., a downstream parameter) such as a brightness setting and/or a contrast setting of the playback system 210.

Figure 2:
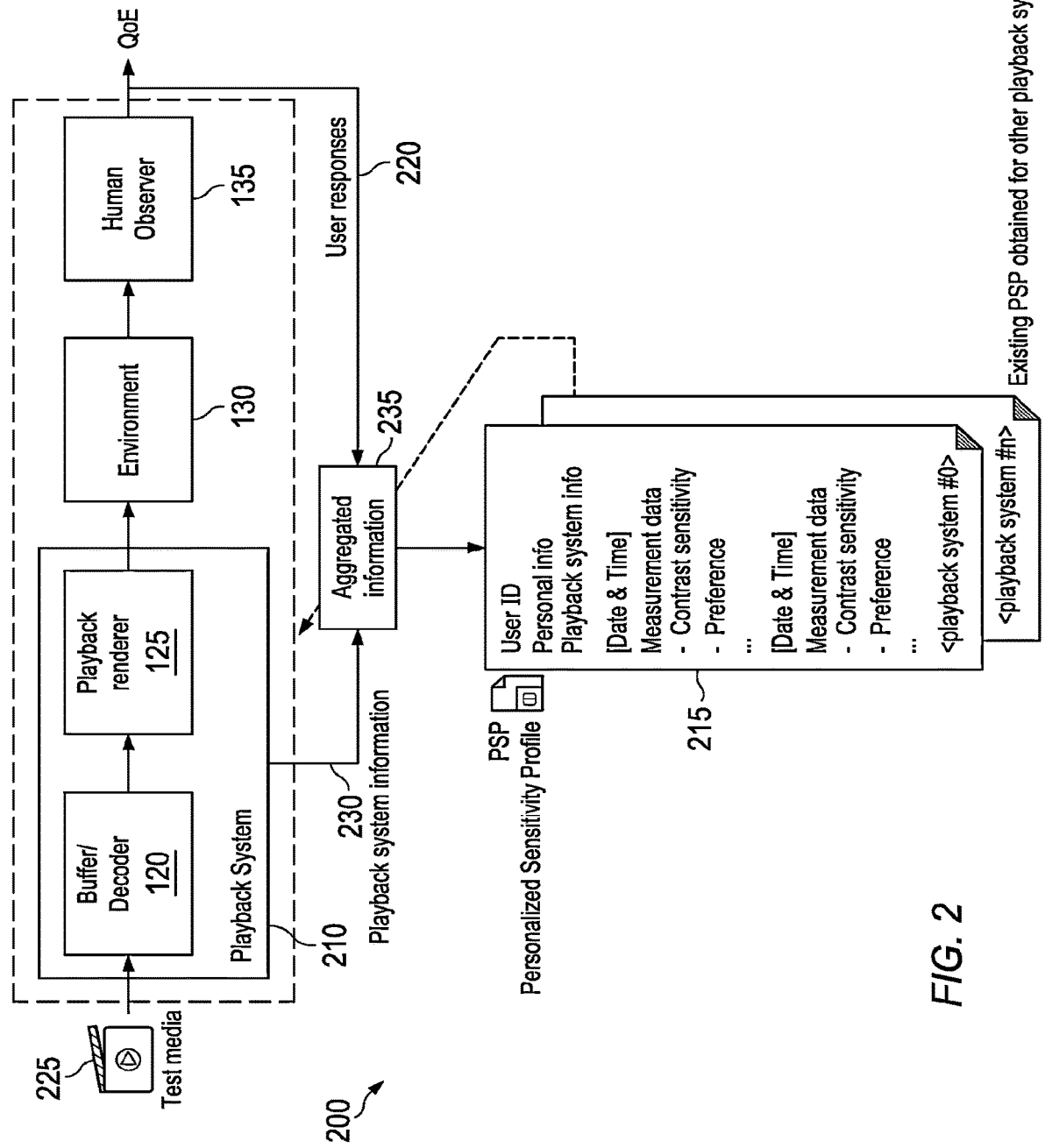
FIGS. 2 and 3 illustrate portions of adaptive bit rate (ABR) based media coding and delivery systems that are configured to determine individualized/personalized viewing characteristics during test measurement sessions according to some embodiments described herein.
Figure 3:
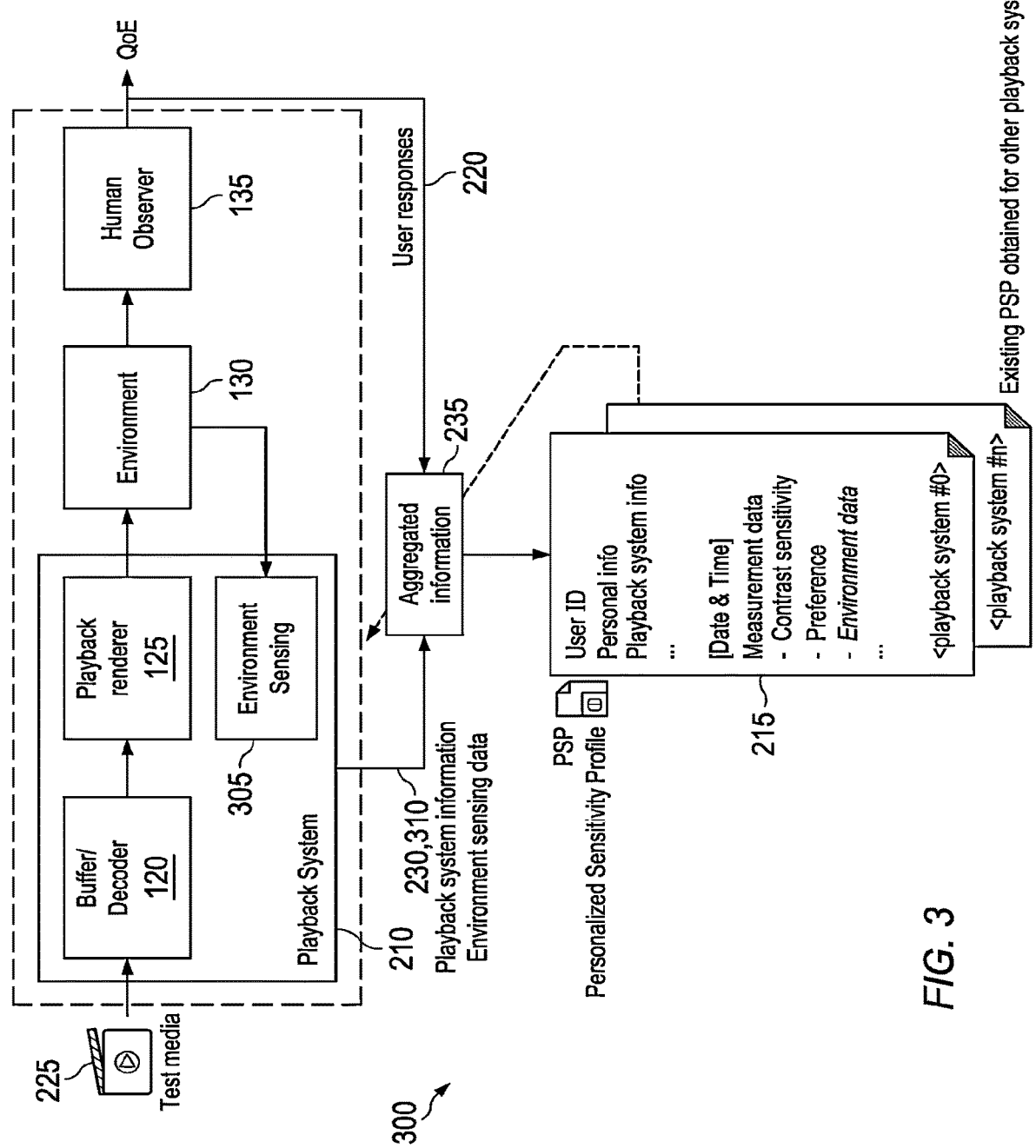

FIGS. 2 and 3 illustrate portions of adaptive bit rate (ABR) based media coding and delivery systems 200 and 300 that are configured to determine individualized/personalized viewing characteristics during test measurement sessions according to some embodiments. Test measurement sessions may be used to address the above-noted problems of ABR-selection logic (and/or other media delivery methods) by additionally taking personalized viewing characteristics into account with (see FIG. 3) or without (see FIG. 2) using separate sensors to collect this additional information.

FIG. 2 includes a playback system 210 that includes some similar components as the playback system 110 of FIG. 1. For example, the playback system 210 includes the buffer/decoder 120 and the playback renderer 125. While not shown in FIG. 2, the playback system 210 may be communicatively coupled to a media server via a network similar to the media server 105 and the network 115 shown in FIG. 1. However, instead of including the generic objective model 145 as shown in FIG. 1, the playback system 210 may generate a personalized (i.e., individualized) sensitivity profile (PSP) 215 for numerous different users 135 and/or environments 130. These personalized sensitivity profiles 215 may be used to provide ABR requests (or other requests with respect to other media delivery methods) to a media server streaming media to the playback system 210. While the personalized sensitivity profiles 215 are explained below as being generated by the playback system 210 (e.g., an electronic processor of the playback system 210), in some embodiments, generation and storage of the personalized sensitivity profiles 215 may additionally or alternatively be performed by an electronic processor at the media server, an electronic processor at a remote cloud computing cluster, or a combination thereof as described in further detail herein.

To generate a personalized sensitivity profile 215, the playback system 210 implements a test measurement session where user responses 220 to test media 225 are collected from the user 135. During the test measurement session, the sensitivity of a user 135 is measured given their typical viewing conditions and environment. As an example, a user 135 would sit in a typical viewing position (e.g., on a sofa in the family room, which represents a typical viewing condition in terms of viewing distance, viewing angle, ambient luminance, and playback system characteristics and settings). The playback system 210 then guides the user 135 through a test measurement session to measure the audiovisual sensitivity of the user 135 in the environment 130 by following instructions provided by the playback system 210. In the session, the user 135 may be asked to make one or more selections using a remote control according to a series of images and/or videos presented by the playback system 210. For example, the playback system 210 may display multiple images and request that the user select the image that appears most clear/in focus to the user 135. As another example, the playback system 210 may display an image with multiple interpretations that depend on the vision capabilities of the user 135 and the viewing distance of the user and request that the user select the interpretation that is most dominant/evident to the user.

From the test measurement session, the playback system 210 and/or the media server 105 may determine personalized viewing characteristics of the user 135 and/or the environment 130. For example, the user responses 220 received during the test measurement session may indicate system factors such as playback system characteristics, playback parameter settings, post-processing algorithms of the playback system 210 (usually proprietary to the device manufacturer), and the like. As another example, the user responses 220 received during the test measurement session may indicate environmental factors such as viewing distance, viewing angle, ambient luminance, ambient noise, user expectation, and the like. In some embodiments, user expectation refers to conscious or subconscious psychological aspects of the user 135 that may affect their perceived QoE. For example, the expectation level of the user 135 may be higher for media associated with a paid subscription than for other media such as free video on-demand services. As yet another example of personalized viewing characteristics of the user 135 and/or the environment 130, the user responses 220 received during the test measurement session may indicate human factors such as sensory acuity/vision sensitivities and capabilities of the user 135, age, gender, and the like. As indicated in FIG. 2, in some embodiments, the playback system 210 may additionally provide playback system information 230 (e.g., device type, display resolution, etc.) in a similar manner as explained above with respect to the system 100 of FIG. 1. The playback system 210 may use aggregated information 235 including the playback system information 230 and the user responses 220 to the test media 225 to determine the personalized sensitivity profile 215 for a particular user 135 and/or environment 130.

As shown in FIG. 2, the personalized sensitivity profile 215 may include a user identification, other personal information (i.e., the individualized viewing characteristics of the user 135 as determined by the user responses 220), playback system information 230, and one or more of geographic location, weather information, dates, and times at which the test media 225 was displayed to the user 135 during one or more measurement sessions. In the example personalized sensitivity profile 215 shown in FIG. 2, each personalized sensitivity profile 215 may be associated with a user and may include multiple sub-profiles for different environments in which the user 135 has participated in test measurement sessions (e.g., different rooms of the user's home, different times of day, different weather information (e.g., sunny versus cloudy), etc.). In other embodiments, each personalized sensitivity profile 215 may be associated with a user and a specific environment such that each user may have multiple personalized sensitivity profiles 215 that each correspond to different environments in which the user 135 has participated in test measurement sessions.

While the above-noted personalized viewing characteristics are not explicitly collected by separate sensors (e.g., a sensor that measures the distance between the playback device 210 and the user 135), the system 200 is able to determine/estimate one or more of these characteristics based on the user responses 220 to the test media 225 during the test measurement session. Thus, in some embodiments, personalized viewing characteristic information is able to be gathered from the user 135 and the environment 130 without the use of separate, explicit sensors. In other embodiments, separate explicit sensors may be used to provide additional information (see, e.g., FIG. 3).

FIG. 3 illustrates a portion of an adaptive bit rate (ABR) based media coding and delivery system 300 that is similar to the portion of the system 200 in FIG. 2. However, the system 300 additionally includes one or more environment sensors 305. For example, the playback system 210 may include or may be communicatively coupled to a brightness/luminance sensor that measures the ambient light in the environment 130 (e.g., integrated sensors, smart home sensors communicatively coupled to the playback system 210, etc.). The environment sensors 305 may include other smart home sensors located in the environment 130 that indicate, for example, whether lights are on/off, whether curtains covering windows are open/closed, etc. The environment sensors 305 may be configured to determine a time of day and a geographic location of the playback system 210 for purposes of determining daylight hours, for example. Environment sensing data 310 from the environment sensor(s) 305 may be included in the aggregated information 235 and may be included in the personalized sensitivity profile 215 as indicated in FIG. 3. In some embodiments, environment sensing data 310 included in the aggregated information 235 includes user provided information such as level of social activity in the environment 130 and/or viewing distance.

Collecting user responses 220 to test media 225 during a test measurement session implicitly takes into account many personalized viewing characteristics that would otherwise be difficult, unrealistic, and/or obtrusive to explicitly collect using sensors. Additionally, in some situations, data explicitly collected using sensors may not allow for an accurate determination of QoE of a the user 135. Accordingly, the systems 200 and 300 provide a number of potential advantages and benefits.

One example benefit relates to user variability. Two different users may have identical environmental characteristics (e.g., viewing distance, luminance, screen size, etc.). However, these two different users may have significantly different viewing capabilities due to, for example, differences in refractive error, age, and/or eye disease. Thus, using physical context/environmental characteristics alone to determine ABR requests (or requests with respect to other media delivery methods) may result in different levels of QoE for these different users. In some embodiments, the personalized sensitivity profiles 215 of the systems 200, 300 take these differences in personalized viewing capabilities into account when determining ABR requests in order to prevent and/or diminish reduction in personalized QoE for each user.

Another example benefit is the ease in which the systems 200 and 300 may be implemented. In some embodiments, additional sensors need not be added to playback systems 210. Along similar lines, user privacy is protected as specific details of the user's environment may not be explicitly measured and recorded in some embodiments. Rather, in some embodiments, a wholistic evaluation of the user responses 220 that only implicitly includes more detailed factors (such as the user's viewing distance and viewing capabilities) is used to generate ABR requests to the media server 105. In other words, the ABR request is based on a composite measurement that is not based on the collection of independent attribute measurements from separate sensors. Rather, the ABR request in the systems 200 and 300 is a holistic and implicit measurement of user QoE reflecting the combined effect of many factors, which are difficult or even impossible to collect explicitly.

Yet another example benefit relates to personalized content enhancement for the user 135. In addition to enabling a more holistic and accurate estimation of end-user QoE, the systems 200 and 300 allow for enhancing the media/content being played back to the user 135. Specifically, parts of a video frame that are either too small or too low in contrast to be perceived by the user (i.e., with spatial frequency or contrast beyond a user's measured contrast sensitivity function (CSF)) could be enhanced by the playback system 210. Examples of such enhancement may include cropping and magnifying the frame and/or applying local contrast adjustments to ensure that salient parts of the scene are visible to the user 135 (i.e., within the user's measured CSF). Such enhancement may improve the user's viewing experience by helping the user 135 follow the media/content and remain engaged with the media/content being watched.

Referring back to FIG. 1, the generic objective model 145 to generate the ABR request 140 may include any one of numerous models to estimate QoE. For example, one generic model is used to construct ABR-ladder 137 (or another media delivery method), including multiple versions of bit rate/quality of media segments of the reference source media, typically by analyzing audio/video signals and optimizing coding efficiency. Another model is used for selecting appropriate bit rate/quality decision of ABR streaming based on network status and playback device loading. However, none of the example types of models take into consideration a user's personalized viewing characteristics. The personalized sensitivity profiles 215 may be applied to any type of generic model 145 to build a personalized objective model (POM) 405 from a generic objective model 145 (see FIGS. 4 and 6).

Figure 4:
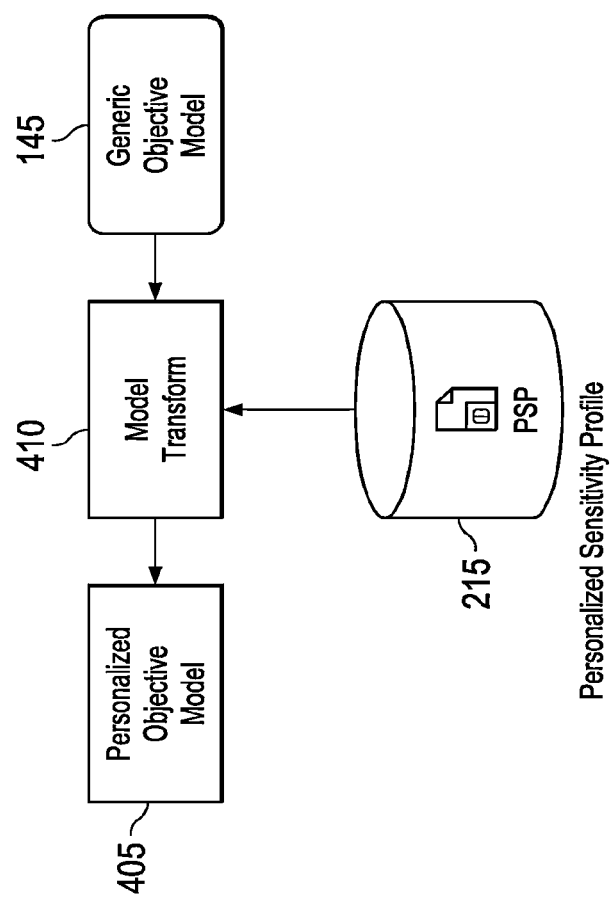
FIG. 4 illustrates a block diagram of a generic objective model being transformed into a personalized objective model via a model transform according to embodiments described herein.

FIG. 4 illustrates a block diagram of a generic objective model 145 being transformed into a personalized objective model 405 via a model transform 410. The transformation may occur according to one or more goals desired to be achieved in media delivery control and management. For example, if the goal is to save media streaming bandwidth by selecting minimum bit rate in the ABR ladder 137 without degrading personalized QoE for each user 135, the systems 200, 300 may determine the JND (just noticeable difference) of image/video in the resolution—bit rate grid space. The systems 200, 300 may then transform the generic objective model 145 into the personalized objective model 405 for each user 135/playback system 210 based on the personalized JND of the user 135 as determined based on the personalized sensitivity profile 215 of the user 135 in the environment 130 in which the user 135 is using the playback system 210.

Figure 5:
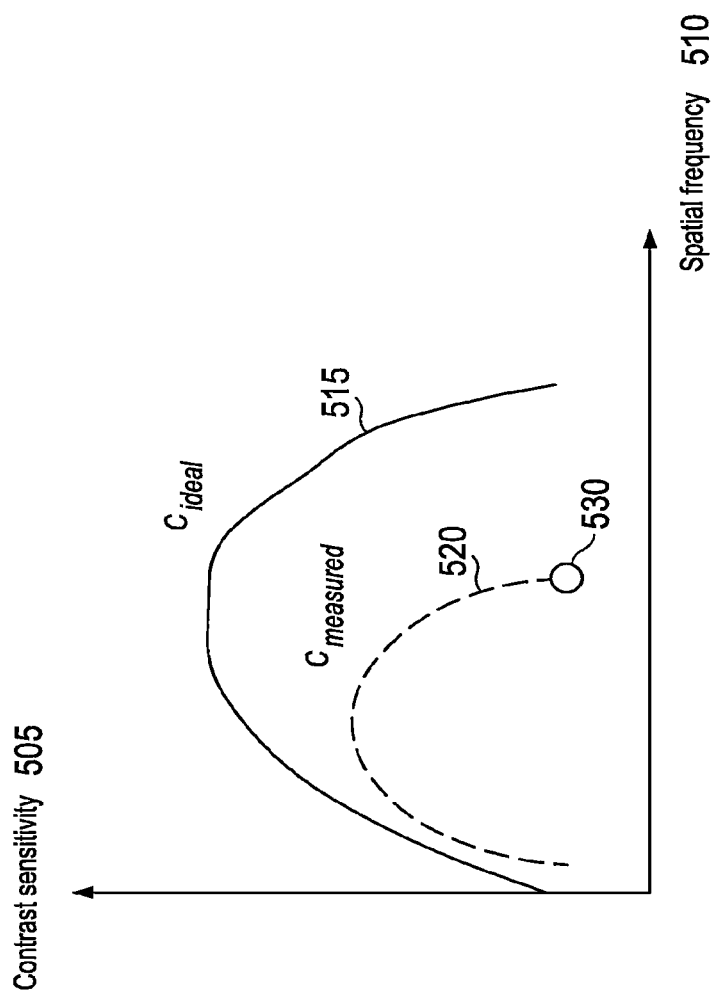
FIG. 5 illustrates a graph including two different contrast sensitivity functions (CSFs) that show example relationships between contrast sensitivity and spatial frequency according to embodiments described herein.

As another example, for a more sophisticated streaming management encompassing real-time or non-real-time pre-processing, encoding, transcoding or transrating in the loop, the systems 200, 300 may estimate personalized psychometric functions, such as spatial contrast sensitivity, temporal contrast sensitivity, and spatial-temporal contrast sensitivity for achromatic and color-opponent stimuli to construct the personalized objective model 405. For example, FIG. 5 illustrates a graph including two different contrast sensitivity functions (CSFs) that show example relationships between contrast sensitivity 505 and spatial frequency 510. The solid line curve illustrates an ideal CSF 515. The dashed line curve illustrates an example user CSF 520 of the user 135 as determined based on the user responses 220 to test media 225 during a given test measurement session. As shown in FIG. 5, the user CSF 520 is translated and scaled compared with the ideal CSF 515 due to, for example, longer viewing distance in the environment 130 than in an ideal viewing environment, lower brightness of the television screen than in an ideal viewing environment, and the user 135 having myopia/nearsightedness. Also as shown in FIG. 5, compared to the ideal CSF 515, the user 135 has a smaller range of perceptible difference in contrast sensitivity 505 relative to spatial frequency 510. In other words, the vision capabilities of the user 135 are not as sensitive as those of an ideal user due to, for example, the environmental and personal conditions mentioned above. For example, the user 135 may not be capable of distinguishing differences in contrast when the spatial frequency 510 increases above a second value 530.

Accordingly, providing higher quality streaming of media that would allow for an ideal user with ideal contrast sensitivity in an ideal environment to experience increased QoE would not actually result in increased QoE for the example user 135 with the user CSF 520 shown in FIG. 5. Thus, if providing this higher quality streaming comes at an expense to the system 200, 300 (e.g., more bandwidth used because the media is streamed used a higher bit rate), this expense experienced by the system 200, 300 is essentially wasted because it does not result in improved QoE for the user 135 viewing the streamed media.

To aid the system 200, 300 to control streaming of media from the media server 105, the user CSF 520 is one example of data included in the personalized sensitivity profile 215 that is used to transform the generic objective model 145 into the personalized objective model 405 (see FIG. 4). For example, the generic objective model 145 may use data corresponding to the ideal CSF 515 or data corresponding to another generic CSF that is not personalized to a user's viewing environment and personal vision capabilities. On the other hand, the personalized objective model 405 may use the user CSF 520 that has been scaled and translated to be personalized to the user's viewing environment and personal vision capabilities. The user CSF 520 may be used in combination with the other factors and/or algorithms included in the generic objective model 145 to create the personalized objective model 405. As indicated by the above example of streaming higher quality media than can be perceived by the user 135, the personalized objective model 405 may be utilized during video encoding, transcoding, and/or transrating to improve coding efficiency to improve network efficiency (e.g., by reducing bandwidth) without affecting the personalized QoE of the user 135. For example, higher quality media may be streamed to more sensitive users 135 that are able to perceive the higher quality media while lower quality media may be streamed to less sensitive users 135 that are not able to perceive a difference in quality between the lower quality media and the higher quality media.

Although the example graph shown in FIG. 5 refers to contrast sensitivity of the user 135, the generic objective model 145 may include values and/or functions related to other types of viewing characteristics that may be personalized based on the user responses 220 to the test media 225 (e.g., temporal degradation related to video frame rate, quantization degradation, etc.). For example, generic media parameter values and/or functions characterizing the generic temporal degradation model may be replaced or retrained to generate personalized values and/or functions in a personalized objective model 405. Additionally or alternatively, generic algorithms used to determine media parameters (i.e., streaming parameters), such as the ABR request 140 (or requests with respect to other media delivery methods), may have coefficients adjusted to generate a personalized objective model (POM) 405.

Figure 6:
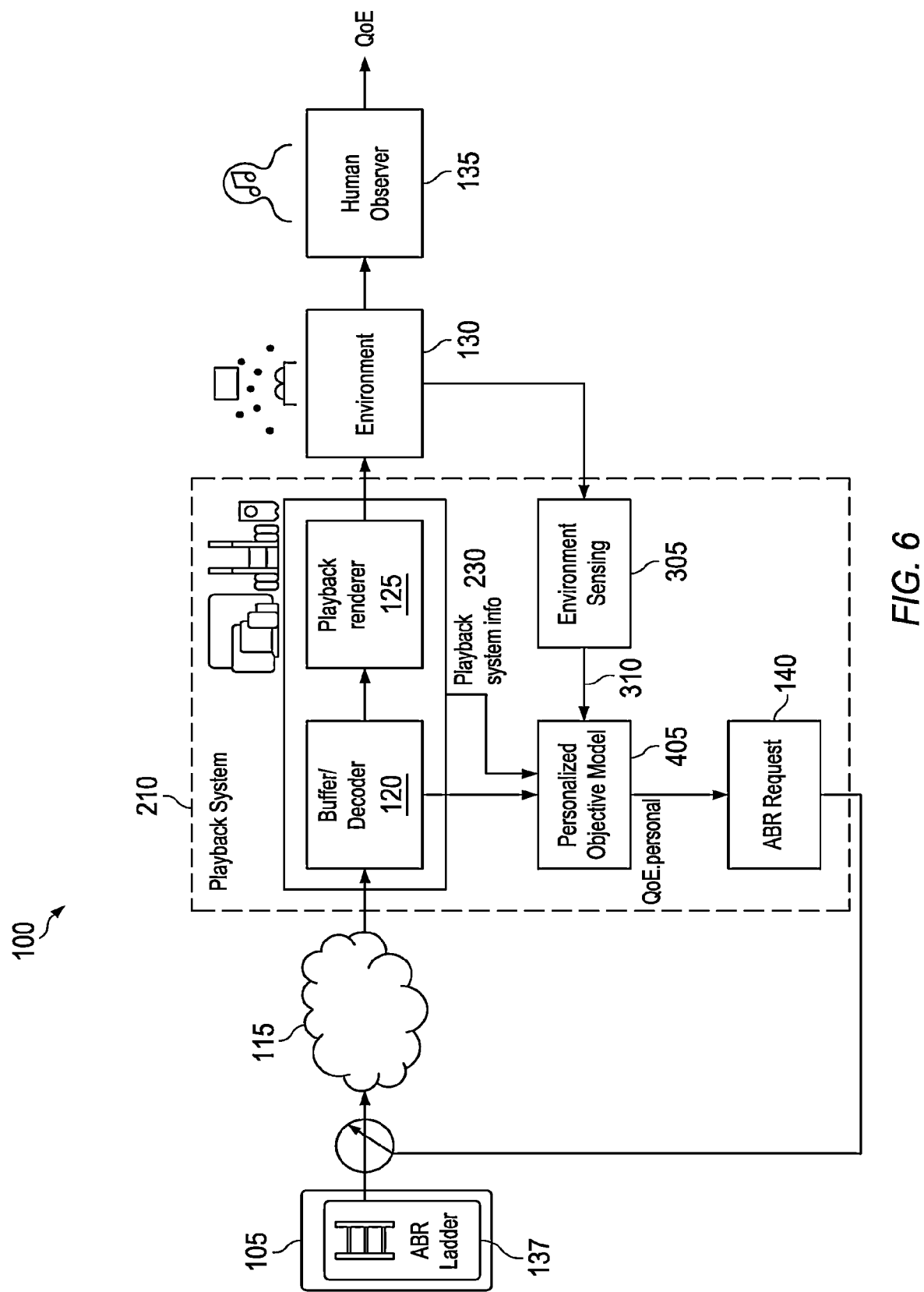
FIG. 6 illustrates a modified adaptive bit rate (ABR) based media coding and delivery system according to embodiments described herein.

FIG. 6 illustrates a modified adaptive bit rate (ABR) based media coding and delivery system 600. The system 600 is similar to the system 100 of FIG. 1 but includes the personalized objective model (POM) 405 used to generate the ABR request 140 (or a request with respect to another media delivery method) instead of the generic objective model 145. In some embodiments, the system 600 includes at least one of the portions of the systems 200, 300 shown in FIGS. 2 and 3. For example, as shown in FIG. 6, the personalized objective model 405 takes into account playback system information 230, environment sensing information 310, and personalized viewing characteristic information from a PSP 215 as determined based on user responses 220 to test media 225 as described above.

Additional data sources that may be used by the POM 405 to generate the ABR request 140 (or a request with respect to another media delivery method) include, but are not limited to real-time media player status information including buffer size, playback status, player performance characteristics, etc. Another data source that may be used by the POM 405 includes real-time network performance estimates such as throughput measured by the playback system 210, throughput measured from sensors located within the network 115, congestion notifications, latency, packet loss rate, etc. Another data source that may be used by the POM 405 includes content metadata including bit rate, resolution, frame rate, bit-depth per sample, chroma sampling, source coding method (including Level & Profile), color space, Supplemental Enhancement Messages (SEI), composition playlist(s), group of pictures (GOP) size, instantaneous decoding refresh (IDR) frame(s), maximum frame-average light level (MaxFALL), maximum content light level (MaxCLL), electro-optical transfer function (EOTF), language, service type, scene descriptions (including boundary information), number of audio channels, audio sample rate, audio sample bit depth, audio service type, digital signing method, SCTE 35 messages, caption data, program loudness, regulatory information, ratings information, etc. In some embodiments, the additional data sources described herein may be referred to as media parameters.

Another data source that may be used by the POM 405 includes network operator policy parameters including maximum allowable bit rate, spatial resolution, frame rate, etc. per downstream and/or upstream channel or channel equivalent. This example data source may allow for network-wide and cross-session optimizations. Another data source that may be used by the POM 405 includes playback environmental sensor information 310 as explained above (e.g., ambient luminance levels, ambient audio noise levels, number of people viewing the streamed content, distance from the screen of each viewer, etc.). Another data source that may be used by the POM 405 includes ancillary mobile device information such as distance from the primary playback system 210, mobile device sensor information, etc. Another data source that may be used by the POM 405 includes real-time user/viewer preferences that may be entered by the user 135 and stored by a memory of one of the devices included in the system 600.

Figure 7:
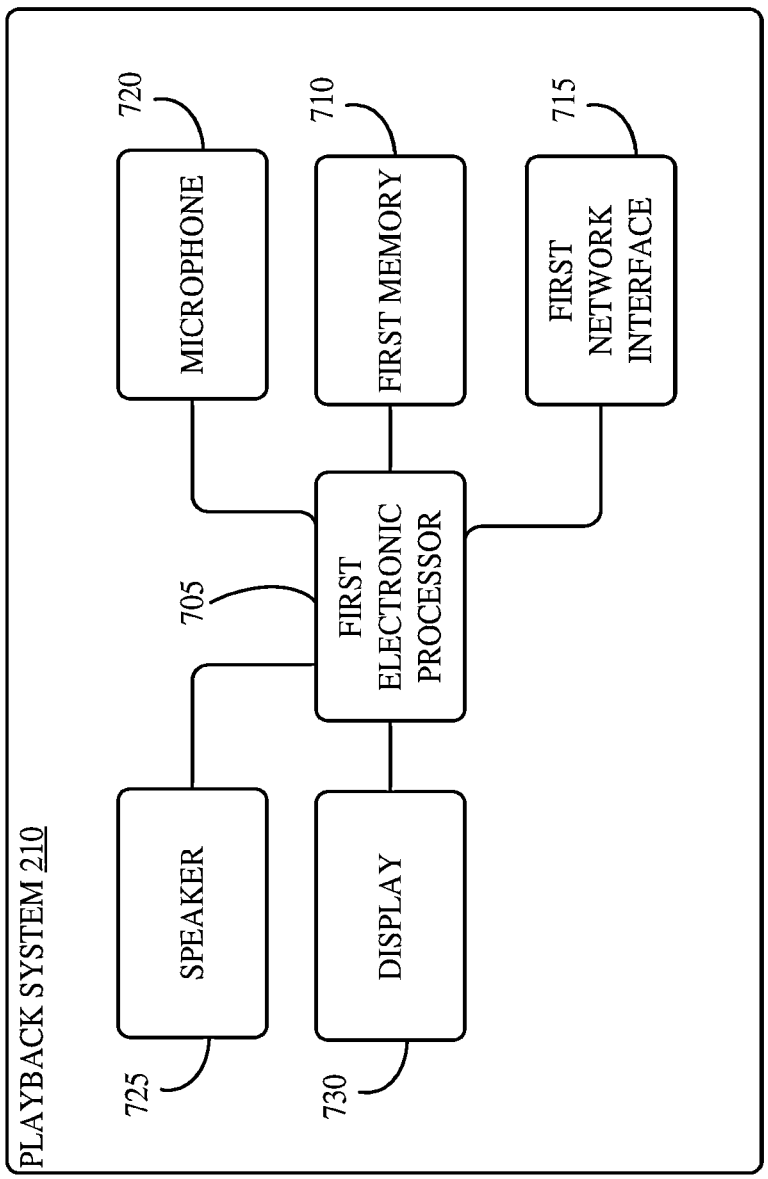
FIG. 7 is a hardware block diagram of the playback system of FIG. 6 according embodiments described herein.

FIG. 7 is a hardware block diagram of the playback system 210 (i.e., playback device) according to one example embodiment. As mentioned above, the playback system 210 may include many different types of playback systems such as a television, a tablet, a smart phone, a computer, and the like. In the embodiment illustrated, the playback system 210 includes a first electronic processor 705 (for example, a microprocessor or other electronic device). The first electronic processor 705 includes input and output interfaces (not shown) and is electrically coupled to a first memory 710, a first network interface 715, an optional microphone 720, a speaker 725, and a display 730. In some embodiments, the playback system 210 includes fewer or additional components in configurations different from that illustrated in FIG. 7. For example, the playback system 210 may not include the microphone 720. As another example, the playback system 210 may include one or more additional input devices such as a computer mouse and/or a keyboard that receive inputs from a user of the playback system 210. As yet another example, the playback system 210 may include environment sensors such as an ambient light sensor and/or a location tracking device (e.g., a global positioning system (GPS) receiver). In some embodiments, the playback system 210 performs functionality other than the functionality described below.

The first memory 710 may include read only memory (ROM), random access memory (RAM), other non-transitory computer-readable media, or a combination thereof. The first electronic processor 705 is configured to receive instructions and data from the first memory 710 and execute, among other things, the instructions. In particular, the first electronic processor 705 executes instructions stored in the first memory 710 to perform the methods described herein.

The first network interface 715 sends and receives data to and from the media server 105 over the network 115. In some embodiments, the first network interface 715 includes one or more transceivers for wirelessly communicating with the media server 105 and/or the network 115. Alternatively or in addition, the first network interface 715 may include a connector or port for receiving a wired connection to the media server 105 and/or the network 115, such as an Ethernet cable. The first electronic processor 705 may receive one or more data streams (for example, a video stream, an audio stream, an image stream, and the like) over the network 115 through the first network interface 715. The first electronic processor 705 may output the one or more data streams received from the media server 105 through the first network interface 715 through the speaker 725, the display 730, or a combination thereof. Additionally, the first electronic processor 705 may communicate data generated by the playback system 210 back to the media server 105 over the network 115 through the first network interface 715.

For example, the first electronic processor 705 may determine and send the ABR request 140 mentioned previously herein to the media server 105. The media server 105 may then transmit one or more media streams to the playback system 210 in accordance with the ABR request 140 from the playback system 210.

The display 730 is configured to display images, video, text, and/or data to the user 135. The display 730 may be a liquid crystal display (LCD) screen or an organic light emitting display (OLED) display screen. In some embodiments, a touch sensitive input interface may be incorporated into the display 730 as well, allowing the user 135 to interact with content provided on the display 730. In some embodiments, the display 730 includes a projector or future-developed display technologies. In some embodiments, the speaker 725 and the display 730 are referred to as output devices that present media streams and other information to a user 135 of the playback system 210. In some embodiments, the microphone 720, a computer mouse, and/or a keyboard or a touch-sensitive display are referred to as input devices that receive input from a user 135 of the playback system 210.

Figure 8:
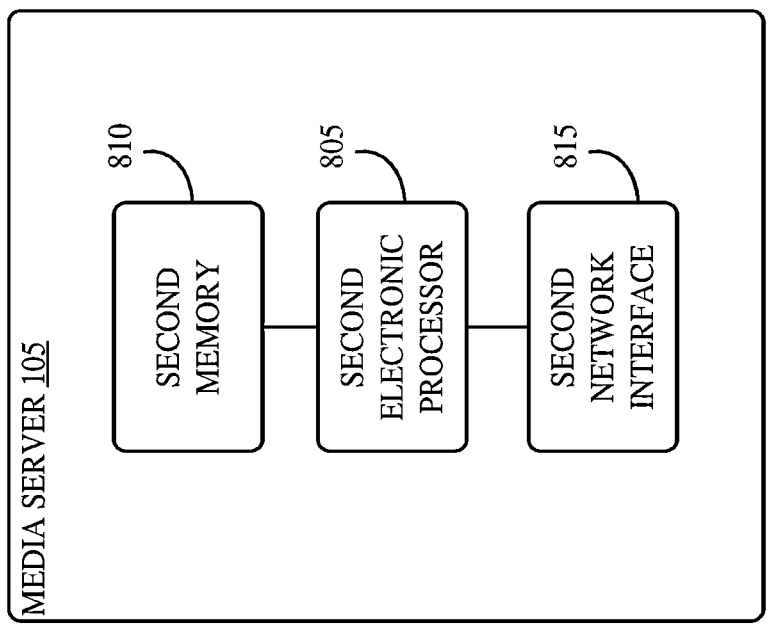
FIG. 8 is a block diagram of the media server of FIG. 6 according to embodiments described herein.

FIG. 8 is a block diagram of the media server 105 according to one example embodiment. In the example shown, the media server 105 includes a second electronic processor 805 electrically connected to a second memory 810 and a second network interface 815. These components are similar to the like-named components of the playback system 210 explained above with respect to FIG. 7 and function in a similar manner as described above. In some embodiments, the second network interface 815 sends and receives data to and from playback systems 210 via the network 115. In some embodiments, the media server 105 includes fewer or additional components in configurations different from that illustrated in FIG. 8. For example, the media server 105 may additionally include a display such as a touch screen to allow a backend user to reprogram settings or rules of the media server 105. In some embodiments, the media server 105 performs functionality other than the functionality described below.

While FIGS. 7 and 8 show separate block diagrams of the playback system 210 and the media server 105, in some embodiments, the media server 105, one or more playback systems 210, a remote cloud-computing cluster that communicates over or forms a part of the network 115, or a combination thereof is referred to an electronic computing device that performs the functionality described herein. For example, the electronic computing device may be a single electronic processor (for example, the second electronic processor 805 of the media server 105) or a plurality of electronic processors located in the media server 105. In other embodiments, the electronic computing device includes multiple electronic processors distributed across different devices. For example, the electronic computing device is implemented on one or more of the first electronic processors 705 of the playback systems 210, the second electronic processor 805 of the media server 105, and one or more electronic processors located in one or more other devices located at a remote location or at a remote cloud-computing cluster that communicates over or forms a part of the network 115. In some embodiments, the remote cloud-computing cluster includes a Software-Defined-Network (SDN)/Network Function Virtualization (NFV)-enabled access-network.

In some embodiments, the device(s) that implements the POM 405 may determine the goal and function of the POM 405. For example, implementation of the POM 405 within the playback system 210 allows for decentralized operation in the absence of network operator or other control signals. On the other hand, implementation of the POM 405 within the media server 105 and/or the network 115 (e.g., as a network virtualized function (NVF) located on a software defined network (SDN) node) may simplify the deployment of network-wide QoE optimizations and other network operator policies (e.g., an optimization of network services to a desired subscriber QoE, Edge/Access-Network capacity target, or a combination of both).

One or more of the hardware components of the playback system 210 shown in FIG. 7 implements and/or makes up the functional components of the playback system 210 shown in FIGS. 2, 3, and 6. For example, the first electronic processor 705 (or multiple first electronic processors 705 of the playback system 210) may act as one or more of the buffer/decoder 120 and the playback renderer 125. The first electronic processor 705 may also determine the personalized sensitivity profile (PSP) 215, the personalized objective model (POM) 405, and the ABR request 140.

In some embodiments, one or more personalized sensitivity profiles (PSPs) 215 of one or more users and environments are stored in the first memory 710 of the playback system 210. The first memory 710 may store additional information such as general playback system information 230 of the playback system 210 (e.g., screen size, product identification number, and the like). In some embodiments, one or more personalized sensitivity profile (PSPs) 215 of one or more users and environments are additionally or alternatively stored in the second memory 810 of the media server 105 and/or a memory of a remote cloud-computing cluster that communicates over or forms a part of the network 115. In some embodiments, cloud-storage of user's PSP(s) 215 enables secure linking to a user's wired/wireless Internet Service Provider (ISP) or network delivered media account (e.g. cable tv). Such linking may be useful for a network operator to leverage individual PSPs 215 for generating more efficient media delivery across the portion(s) of their subscriber base with a PSP 215 associated with their account as described in greater detail herein.

Figure 9:
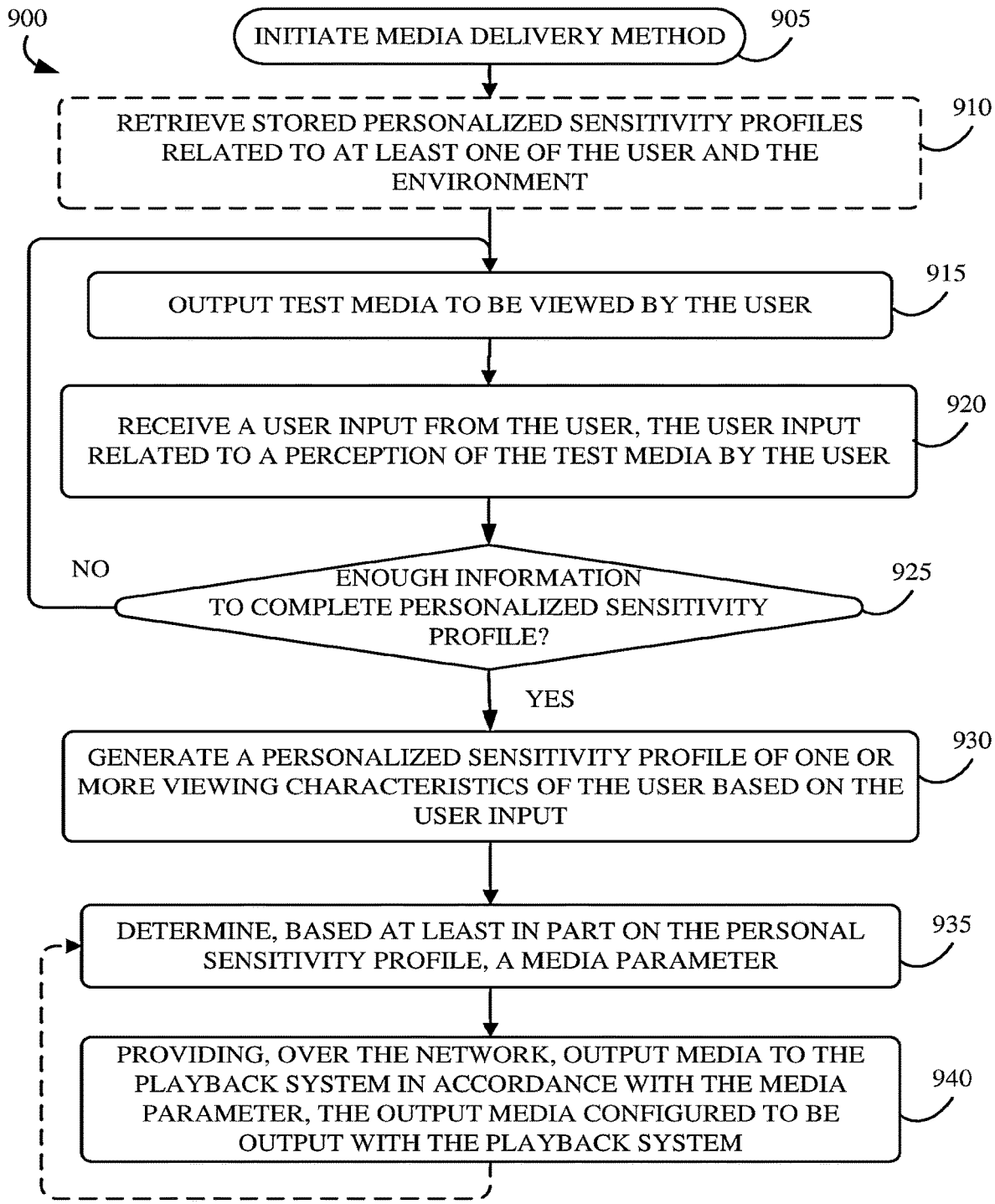
FIG. 9 illustrates a flowchart of a method for delivering media to the playback system of FIG. 6 according embodiments described herein.

FIG. 9 illustrates a flowchart of a method 900 for delivering media to a playback system 210 according to one example embodiment. The method 900 is described as being performed by an electronic computing device including one or more of the electronic processors described previously herein. Although certain actions are explained as being performed by the electronic processor(s) of a certain device, in other embodiments, electronic processors of other devices may perform the same actions. While a particular order of processing steps, message receptions, and/or message transmissions is indicated in FIG. 9 as an example, timing and ordering of such steps, receptions, and transmissions may vary where appropriate without negating the purpose and advantages of the examples set forth in detail throughout the remainder of this disclosure.

At block 905, the media delivery method 900 is initiated. In some embodiments, the media delivery method 900 is initiated by the first electronic processor 705 of the playback system 210 in response to the user 135 turning on the playback system 210 and/or requesting that a data stream be output by the playback system 210.

In response to the media delivery method 900 being initiated, at block 910, one or more electronic processors of the electronic computing device retrieves stored personalized sensitivity profiles (PSPs) 215 related to at least one of the user 135, the playback system 210, and the environment 130 in which the playback system 210 is located. For example, the stored PSPs 215 may have been generated based on previous test measurement sessions of the playback system 210. In some embodiments, a stored PSP 215 may be used by the electronic computing device to provide output media to the playback system 210 without performing a new test measurement session. For example, when the playback system 210 is being used in an environment 130 that has already undergone a test measurement session by the same user 135, the electronic computing device may use a stored PSP 215 corresponding to the environment 130 and the user 135. In some embodiments, the electronic computing device determines that the current environment and user have already undergone a test measurement session by comparing playback system information, environment information, and/or user information (e.g., user login information received by the playback system 210) to stored information of PSPs 215. For example, the electronic computing device may determine an identification number of the playback system 210, one or more characteristics of the environment 130 (e.g., time of day, amount of ambient light, location of playback system 210, and the like), and an identity of the user 135. If this identification information matches with a PSP 215 already stored in one of the memories of the electronic computing device, the electronic computing device may control the providing of output media to and the displaying of output media by the playback system 210 according to the corresponding previously-stored PSP 215 without proceeding to block 915 to perform a new test measurement session.

On the other hand, the method 900 may continue to block 915 where the playback system 210 is controlled to perform a new test measurement session. Here, the new test measurement session can be a full length session or a reduced length session based on a prior knowledges of one or more stored PSPs 215. For example, if one or more of the above-noted types of identification information do not match with a stored PSP 215, the electronic computing device may perform a new test measurement session and generate a new PSP 215 as explained in further detail below. In some embodiments, a new test measurement session is initiated by the user 135 (e.g., via a user input on an input device of the playback system 210). In some embodiments, the electronic computing device may determine that at least one characteristic of a previously-stored PSP 215 has changed (e.g., a power interruption, a change in Internet Protocol (IP) address, a change in WiFi signal strength, a newly-detected peripheral device being coupled to the playback system 210, a change in detected ambient light, a change in detected location of the playback system 210, and the like). In response thereto, the electronic computing device may instruct the playback system 210 to recommend that the user 135 participate in a new test measurement session. For example, the playback system 210 may determine that the user 135 is now viewing the playback system 210 at night rather than during the day (e.g., based on a time of day measurement, based on data received from environmental sensors 305, etc.). As another example, the media server 105 may determine that a new playback system 210 that is not associated with any previously-stored PSPs 215 has been connected to the network 115. In response thereto, the media server 105 may transmit a request to the playback system 210 that recommends the user 135 participate in a test measurement session to generate a PSP 215.

Methods of implementing a test measurement session may include integration into the initial setup steps of a set-top box (STB), Digital Media Adapter (DMA), mobile device, or other playback system 210, as a third-party application running on playback system 210, or as a cloud service that hosts both the test media 225 and/or the PSPs 215. As noted previously herein, test measurement session results may be saved locally on the playback system 210 and/or remotely as part of a cloud service enabling cross-platform and cross-service compatibility.

At block 915, the electronic computing device outputs test media 225 to be viewed by the user 135. The test media 225 may be generated by the first electronic processor 705 of the playback system 210 or may be received by the playback system 210 after being generated by the media server 105. In some embodiments, the test media 225 is generated in order to measure user sensitivity/quality of experience (QoE). For example, at block 920, the electronic computing device receives a user input (i.e., user responses 220) from the user 135. The user input is related to a perception of the test media 225 by the user 135 and indicates a first personalized QoE of the user 135 with respect to the test media 225.

In some embodiments, the electronic computing device determines the user sensitivity/QoE of the user 135 by generating an optotype acuity measurement using test media 225 including a Snellen chart or open ring patterns. In some embodiments, the electronic computing device additionally or alternatively determines the user sensitivity/QoE of the user 135 by generating a contrast sensitivity function (CSF) measurement using sine-wave gratings of different orientations (e.g., see FIG. 5). In some embodiments, the CSF measurement may include a quick CSF method using test media 225 including bandpass-filtered Sloan letters. In some embodiments, the electronic computing device additionally or alternatively determines the user sensitivity/QoE of the user 135 by displaying test media 225 in the form of an interactive game to be played by the user 135. In some embodiments, the electronic computing device additionally or alternatively determines the user sensitivity/QoE of the user 135 by taking user sensitivity measurements based on a set of image or video materials displayed as test media 225.

In some embodiments, the electronic computing device may display test media 225 in the form of hybrid images. In some embodiments, a hybrid image is static image that tends to have distinct interpretations depending on the user's viewing capabilities and environmental factors. As an example, human viewers lose their capability to see fine details of images as the viewing distance is increased, resulting in failing to distinguish between high- and low-resolution videos. In some embodiments, a hybrid image is a static image that produces two or more distinct interpretations to a human user that change as a function of spatial frequency range and/or viewing distance. Based on user responses 220 to displayed hybrid images, the electronic computing device may estimate dominant and non-dominant spatial frequency ranges of the user 135 in the media viewing environment 130 without using an explicit sensor.

To create a hybrid image, two different source images may be processed differently to make a certain spatial frequency range dominant with respect to each image. For example, a first source image may be low-pass filtered and a second source image may be high-pass filtered. The low-pass filtered source image may then be combined with (i.e., overlayed on top of) the high-pass filtered source image to create a hybrid image. Because the sensitive region of a given image in spatial frequency moves from lower frequencies to higher frequencies as the viewing distance of the user 135 is decreased, a human user more easily perceives the high-pass filtered source image at shorter viewing distances than at longer viewing distances. Conversely, a human user more easily perceives the low-pass filtered source image at longer viewing distances than at shorter viewing distances. In other words, either the low-pass filtered source image or the high-pass filtered source image is perceived by the user 135 as dominant depending on one or more viewing characteristics of the user 135.

Figure 10A:
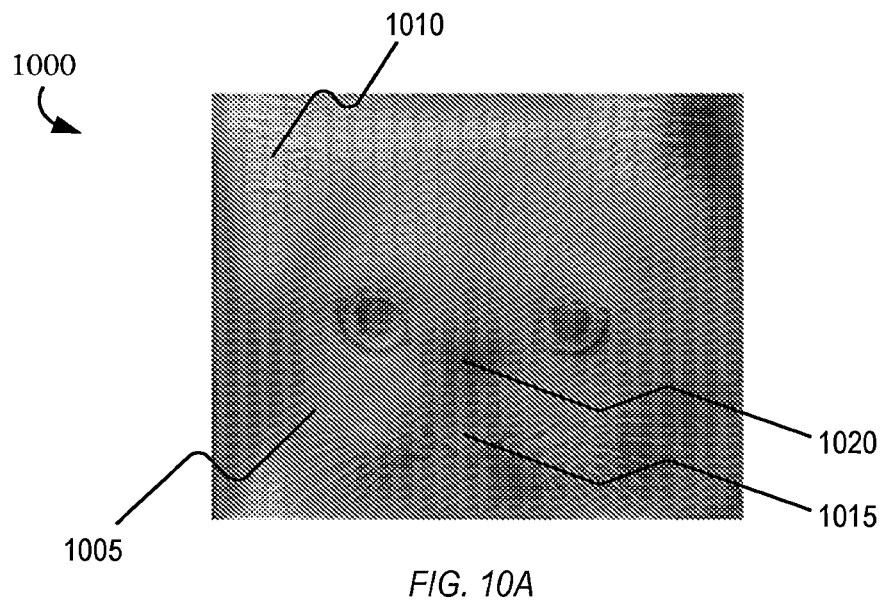
FIGS. 10A-10C illustrate an example hybrid image in three different sizes according to embodiments described herein.
Figure 10B:
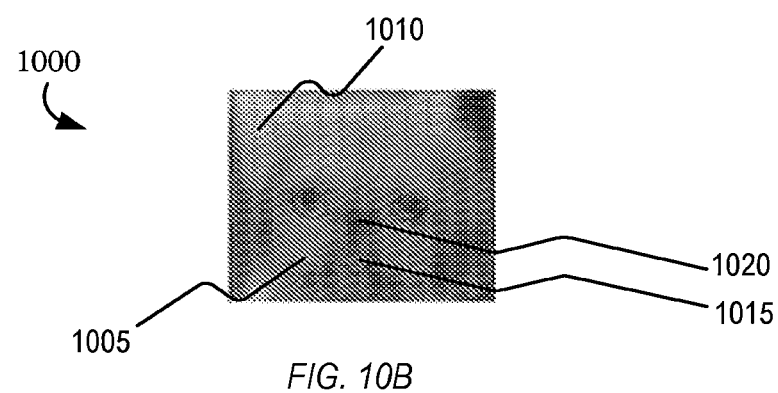
Figure 10C:
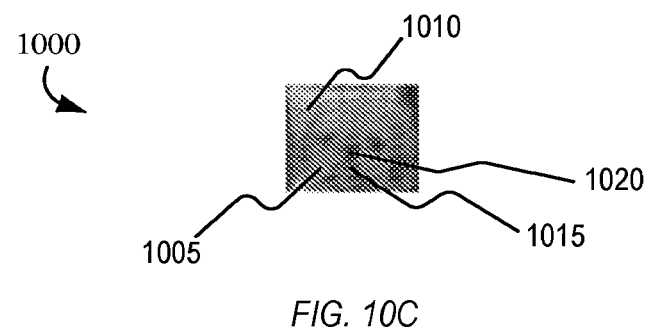
Figure 10D:
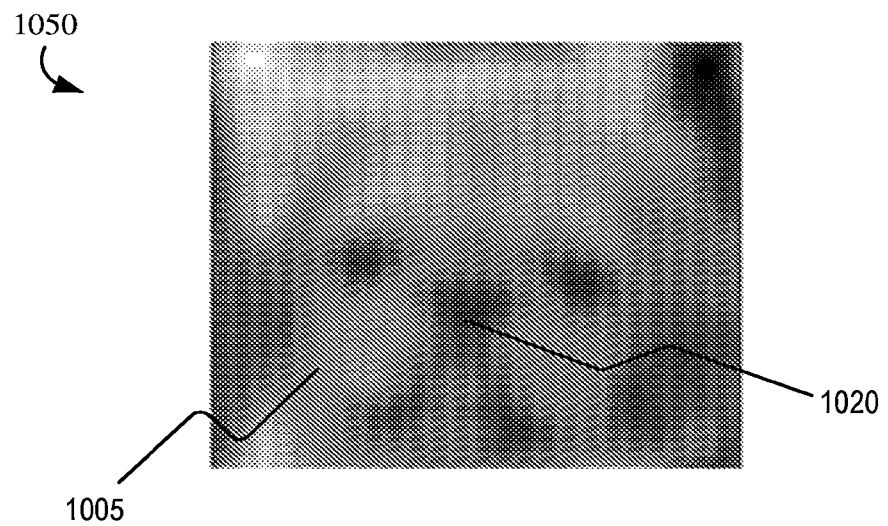
FIG. 10D illustrates a low-pass filtered source image that makes up part of the hybrid image of FIGS. 10A-10C.
Figure 10E:
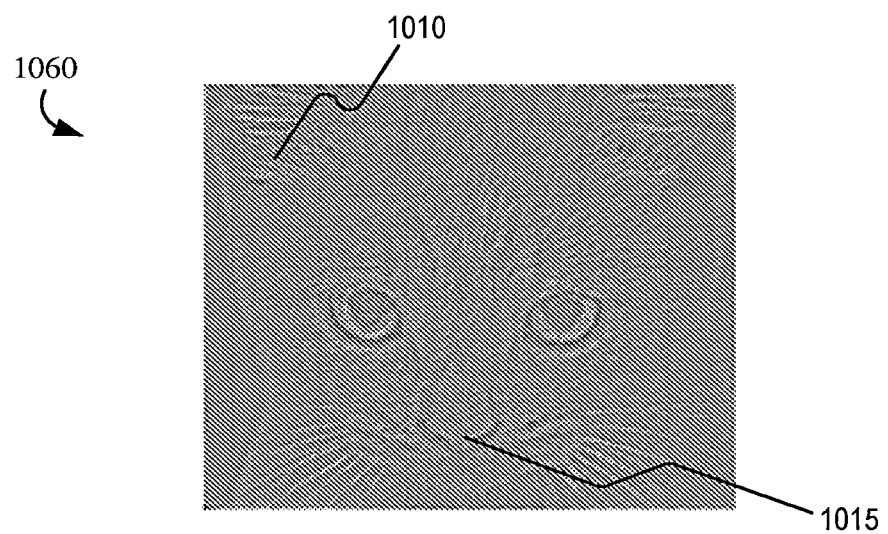
FIG. 10E illustrates a high-pass filtered source image that makes up part of the hybrid image of FIGS. 10A-10C.

FIGS. 10A-10C illustrate an example hybrid image 1000 in three different sizes with FIG. 10A showing the image 1000 in the largest size and FIG. 10C showing the image 1000 in the smallest size. In the example shown, a first source image including a face of a dog 1005 is low-pass filtered (see low-pass filtered source image 1050 of FIG. 10D) and combined with a second source image including a face of a cat 1010 that is high-pass filtered (see high-pass filtered source image 1060 of FIG. 10E). As indicated by FIGS. 10A-10C, the face of the cat 1010 is easier to perceive for a human user in larger FIG. 10A than in smaller FIGS. 10B and 10C due the high-pass filtering of the second source image. In other words, due to high-pass filtering (see FIG. 10E), the hybrid image 1000 includes only fine details of the second source image including the face of the cat 1010 that are easier to perceive when the image 1000 is larger (i.e., a close/short viewing distance). Conversely, the face of the dog 1005 is easier to perceive for a human user in FIG. 10C than in FIGS. 10A and 10B. In other words, due to low-pass filtering (see FIG. 10D), the hybrid image 1000 includes only coarse details of the first source image including the face of the dog 1005 that are easier to perceive when the image 1000 is smaller (i.e., a longer viewing distance). To aid a viewer with visual interpretation of FIGS. 10A-10C, FIGS. 10A-10E have a nose 1015 of the cat 1010 labeled in each figure and a nose 1020 of the dog 1005 labeled in each figure.

Although the generation of hybrid images is explained above as including low-pass filtering and high-pass filtering different source images, in some embodiments, hybrid images are additionally or alternatively generated using different bandpass filters. In some embodiments, varying the size of source images results in scaling up or down in the spatial frequency domain. Accordingly, in combination with filtering, varying the size of source images is another way to generate hybrid images.

By displaying a series/plurality of hybrid images as the test media 225 during the test measurement session at block 915, the electronic computing device may be able to determine viewing characteristics of the user 135 and environmental factors related to the playback system 210. In some embodiments, the electronic computing device may vary a size of the hybrid image displayed by the playback system 210. For example, the electronic computing device may vary a size of the hybrid image until a user response 220 indicates that the user's perception of the hybrid image has changed from a first perception of the first source image to a second perception of the second source image. Based on the size of the hybrid image being displayed at the time the user response 220 was received and based on the resolution and screen size of the playback system 210, the electronic computing device may be able to determine an estimated viewing distance of the user 135, an estimated CSF for the user 135, and/or the like.

In some embodiments, the electronic computing device may vary cutoff frequencies of the low-pass filter and the high-pass filter (or of a band-pass filter) of each source image being used to create a hybrid image either randomly or adaptively based on previous user responses 220 received during the test measurement session. For example, the electronic computing device may receive a first user input related to a first perception of a first hybrid image by the user. In response thereto, the electronic computing device may generate a second hybrid image using filters where a cutoff frequency of at least one filter is based on the first user input related to the first perception of the first hybrid image (e.g., see FIGS. 11A and 11B). The electronic computing device may then control the playback system 210 to output the second hybrid image to be viewed by the user 135.

In some embodiments, the electronic computing device may determine the cutoff frequencies of spatial filters (and/or another characteristic used to generate the hybrid image such as the size of the hybrid image being displayed) based on playback system parameters and/or media parameters supported by the media server and the network 115. For example, the electronic computing device may determine the cutoff frequencies of spatial filters in conjunction with the available video resolutions in the ABR ladder 137 of the media server 105 (or in conjunction with available values of other media parameters based on another media delivery method being utilized by the media server 105). As another example, the electronic computing device may determine the cutoff frequencies based on available bit rates of the media server 105/network 115, available frame rates of the media server 105/network 115, device type of playback system 210, screen size of the display 730 of the playback system 210, and/or other parameters/attributes mentioned previously herein.

In some embodiments, the electronic computing device determines a first value of a media parameter supported by the media server 105 and the network 115. The electronic computing device may also determine a second value of the media parameter supported by the media server 105 and the network 115. The electronic computing device may then at least one of generate and select a hybrid image based on the first value of the media parameter and the second value of the media parameter such that the hybrid image includes a first interpretation corresponding to the first value of the media parameter and a second interpretation corresponding to the second value of the media parameter (e.g., see FIGS. 11A and 11B). The electronic computing device may then control the playback system 210 to display the hybrid image on the display 730.

In some embodiments, the electronic computing device displays additional hybrid images based on the user response(s) 220 to previously-displayed hybrid images as described previously herein. For example, the electronic computing device may at least one of generate and select a second hybrid image based on the first value of the media parameter and a third value of the media parameter (that is determined to be supported by the media server 105 and the network 115) such that the second hybrid image includes a third interpretation corresponding to the third value of the media parameter and a fourth interpretation corresponding to the first value of the media parameter.

In some embodiments, the hybrid images described in the above example are generated by the electronic computing device by overlaying source images as described previously herein. In other embodiments, electronic computing device may retrieve previously-generated and stored hybrid images with characteristics corresponding to the values of the media parameter determined to be supported by the media server 105 and the network 115.

During the test measurement session, the electronic computing device may receive, with an input device of the playback device, a user input from the user 135. The user input indicates that a first interpretation of a hybrid image is perceived by the user 135 when the hybrid image is displayed on the display 730. Based on the user input, the electronic computing device may determine that the user 135 is more sensitive to the first value of the media parameter (e.g., a first spatial frequency range, viewing distance, resolution, and/or the like) than to the second value of the media parameter (e.g., a second spatial frequency range, viewing distance, resolution, and/or the like). In some embodiments, the electronic computing device generates a personalized sensitivity profile 215 of viewing characteristics of the user 135 based on the determination that the user 135 is more sensitive to the first value of the media parameter. The personalized sensitivity profile 215 may include the first value of the media parameter. In some embodiments, the media server 105 may provide, over the network 115, output media to the playback system of the user 135 in accordance with the personalized sensitivity profile 215 as explained previously herein.

Continuing the immediately above example, the electronic computing device may determine, based on the user input, at least one of a subset of spatial frequencies of the hybrid image (i.e., a contrast of the hybrid image) to which the user 135 is most sensitive and a sizing of the hybrid image to which the user 135 is most sensitive. In some embodiments, the viewing characteristics of the personalized sensitivity profile 215 generated by the electronic computing device include the at least one of the subset of spatial frequencies of the hybrid image to which the user is most sensitive and the sizing of the hybrid image to which the user is most sensitive.

As indicated by the above examples, use of hybrid images generated or selected based on media parameters and/or playback system parameters (i.e., media-centric parameters) during the test measurement session may allow the electronic computing device to determine, for example, how different media-centric parameters affect the user's personalized QoE. For example, the electronic computing device may determine how different video resolutions of the ABR ladder 137 (or how different values of a media parameter of another media delivery method) affect the user's personalized QoE. In other words, based on the user responses 220 to the test media 225, the electronic computing device estimates a range of dominant spatial frequencies influencing the user's perception and invisible spatial frequencies. This perceptual information can be used to improve the efficiency of media coding and delivery as explained herein. For example, the lowest video resolution in the ABR ladder 137 can be identified below which the user 135 starts to experience quality degradation compared with the full-resolution video.

Figure 11A:
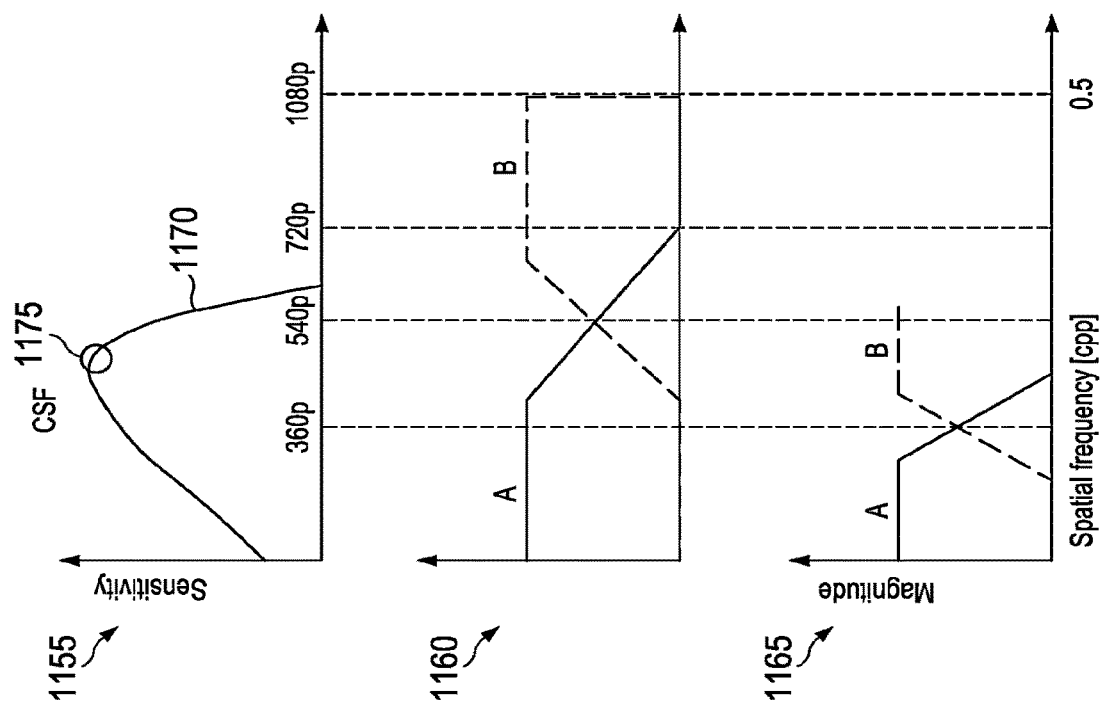
FIGS. 11A and 11B illustrate graphs of example optimal ABR ladder estimates using hybrid images as test media in a multi-step binary tree search during a test measurement session according to embodiments described herein.
Figure 11B:
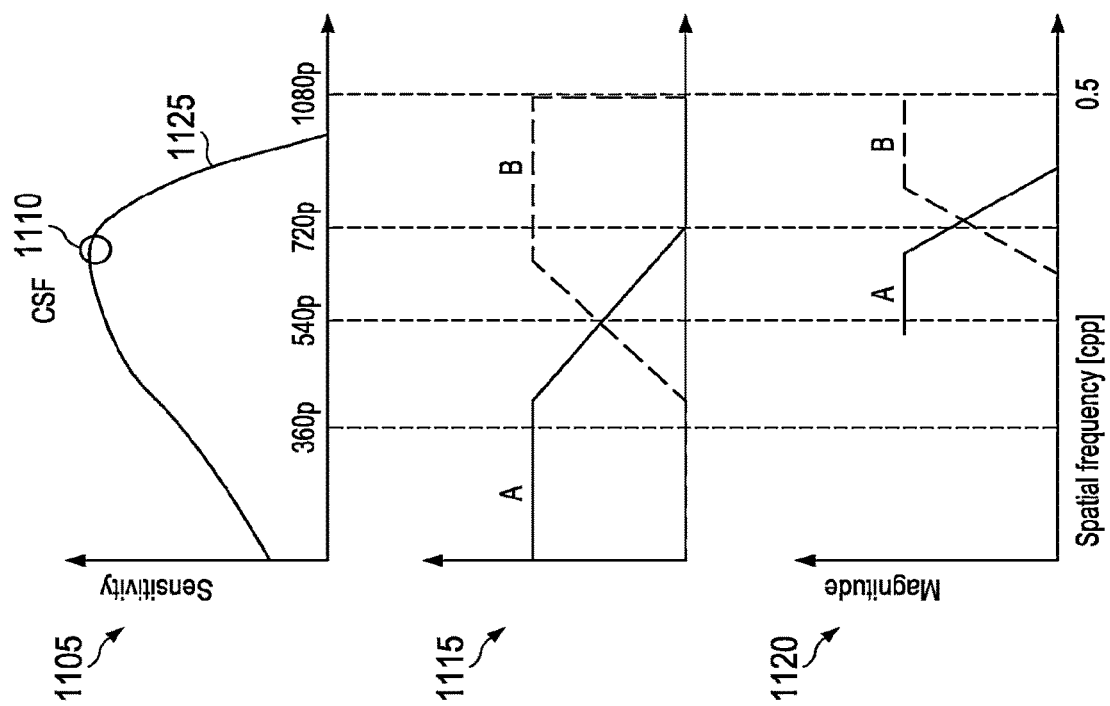

FIGS. 11A and 11B illustrate graphs of example optimal ABR ladder estimates using hybrid images as the test media 225 in a multi-step binary tree search during a test measurement session. In some embodiments, the electronic computing device obtains available video resolutions of media streaming of the media server 105 and the network 115 (e.g., 360p, 540p, 720p, and 1080p) from a manifest file. According to the video resolutions, the electronic computing device determines cutoff frequencies of the low-pass filter and the high-pass filter that are to be applied to source images A and B to create hybrid images. The vertical dotted lines shown in FIGS. 11A and 11B drawn along the rows represent the upper frequency limit of the corresponding video resolutions in the ABR ladder 137. For example, the spectral contents of the 540p video can take only up to the second vertical dotted line from the left. The top graph 1105, 1155 in each of FIGS. 11A and 11B shows a presumed contrast sensitivity function (CSF) as a function of spatial frequency [cycle per pixel] for a user 135 at a certain viewing distance. As shown in FIG. 11A, a peak 1110 of the sensitivity of the user 135 lies between the 540p point and the 720p point.

The middle graph 1115 in FIG. 11A illustrates sensitivity of a first hybrid image created from the filtered source images A and B. As indicated by the graph 1115, the electronic computing device may initially set the spatial frequency at which a change in human perception of the source images A and B of the first hybrid image may occur to be at 540p. Based on the user response 220 to the first hybrid image (i.e., test media 225), the electronic computing device determines which source image A or B is perceptually more dominant to the user 135. When the user response 220 indicates that source image B is more dominant, the electronic computing device may generate a second hybrid image represented by the bottom graph 1120 of FIG. 11A. As indicated by the bottom graph 1120, the electronic computing device may set the spatial frequency at which a change in human perception of second source images A and B of the second hybrid image may occur to be at 720p based on the user response 220 selecting source image B from the display of the first hybrid image represented by the middle graph 1115. Through displaying of multiple hybrid images that are dynamically/adaptively adjusted based on user responses 220, the electronic computing device is configured to narrow down the dominant frequency range perceptible to the user 135. The electronic computing device may be configured to determine an estimated CSF 1125 as shown in the top graph 1105 of FIG. 11A based on the user responses 220 received throughout the test measurement session. Although only two iterations of graphs representative of displayed hybrid images are shown in FIG. 11A, in some embodiments, the electronic computing device displays additional hybrid images (i.e., test media 225) and receives additional corresponding user responses 220 during the test measurement session.

FIG. 11B is a similar example as FIG. 11A but corresponds to a different user 135, environment 130, and/or playback system 210 (e.g., the same user 135 and playback device 210 but a farther viewing distance than that of the example of FIG. 11A). The graphs 1155, 1160, and 1165 generally correspond to the respective graphs 1105, 1115, and 1120 of FIG. 11A with values adjusted according to the different viewing situation as noted above. As indicated by the graph 1160, the electronic computing device may initially set the spatial frequency at which a change in human perception of the source images A and B of a first hybrid image may occur to be at 540p. Based on the user response 220 to the first hybrid image (i.e., test media 225), the electronic computing device determines which source image A or B is perceptually more dominant to the user 135. Unlike the example shown in FIG. 11A, when the user response 220 indicates that source image A is more dominant, the electronic computing device may generate a second hybrid image represented by the bottom graph 1165 of FIG. 11B. As indicated by the bottom graph 1165, the electronic computing device may set the spatial frequency at which a change in human perception of second source images A and B of the second hybrid image may occur to be at 360p based on the user response 220 selecting source image A from the display of the first hybrid image represented by the middle graph 1160. As explained above with respect to FIG. 11A, the electronic computing device may continue displaying hybrid images and receiving user responses 220 to determine an estimated CSF 1170 as shown in the top graph 1155 of FIG. 11B.

As shown in FIGS. 11A and 11B, the CSFs 1125 and 1170 are different than each other due to differences in one or more of users 135, environments 130, and/or playback systems 210. For example, the CSF 1170 of FIG. 11B has a sensitivity peak 1175 at a lower resolution than the sensitivity peak 1110 of the CSF 1125 of FIG. 11A. As another example, the overall range of the CSF 1170 of FIG. 11B is less than that of the CSF 1125 of FIG. 11A such that the user of FIG. 11A is able to distinguish between different resolutions greater than approximately 540p while the user of FIG. 11B is not able to distinguish between different resolutions greater than approximately 540p.

As is evident from the above explanation, the CSFs 1125 and 1170 are personalized CSFs based on the user responses 220 received by the electronic computing device in response to the displayed hybrid images and/or other test media 225. The personalized CSFs determined by the electronic computing device are similar to the CSF 520 shown in FIG. 5 and explained previously herein. In other words, instead of using generic ABR logic (e.g., the ideal CSF 515 of FIG. 5) to control media streaming from the media server 105 to the playback system 210, the electronic computing device may use personalized bit rate/resolution decisioning rules to do so. In some embodiments, the electronic computing device generates a new, personalized ABR ladder based on the user responses 220 to the test media 225 during the test measurement session.

In some embodiments, one or more stored PSPs 215 may influence characteristics of the test media 225 output by the playback system 210 during the test measurement session. In some embodiments, the electronic computing device retrieves a previously-stored personalized sensitivity profile (PSP) 215 and generates the test media 225 based on one or more viewing characteristics included in the previously-stored PSP 215. In some embodiments, to retrieve the previously-stored PSP 215, the electronic computing device determines a characteristic of a current/in-progress test measurement session including at least one of a characteristic of the user 135, a characteristic of the first playback system 210, and a characteristic of an environment 130 in which the user 135 is viewing the first playback system 210. The electronic computing device then may identifying the previously-stored PSP 215 from a plurality of previously stored PSPs 215 based on the previously-stored PSP 215 including one or more of the same characteristics as the characteristic of the current/in-progress test measurement session.

For example, the electronic computing device may determine that a stored PSP 215 includes information about the same user 135 but that the current playback system 210 and/or the current environment 130 is different than the stored playback system 210 and/or environment 130 (e.g., the same user is watching television on a different television in a different room in their house). Despite the characteristics of the stored PSP 215 not exactly matching the current situation, the electronic computing device may nevertheless use one or media parameters of the stored PSP 215 as a baseline to begin outputting test media 225 during the test measurement session. In other words, the electronic computing device may output test media 225 (such as a hybrid image) that is filtered or otherwise altered in accordance with the stored PSP 215 rather than outputting test media 225 randomly or according to a generic model. In some situations, outputting test media 225 based on the media parameters included in the stored PSP 215 may reduce the duration of the test measurement session and/or to improve measurement accuracy best suited for the current situation.

For example, if a contrast sensitivity function (CSF) is generated by the electronic computing device to specify personalized sensitivity information, typically several tens of measurements are required to accurately estimate the media parameters of the CSF in one test measurement session. However, when the electronic computing device begins the test measurement session from a starting point that was already measured for the user 135 in a different environment 130 and/or by a different playback system 210 (or for another common attribute besides having a common user 135), the number of measurements required to accurately estimate the media parameters in the current situation may be reduced compared to the typical amount. In other words, the spatial frequency and contrast of current stimulus for the CSF measurement in the current test measurement session may be adjusted according to the user responses 220 of previous test media 225 and the estimate of CSF from previously stored PSPs 215.

Along similar lines, in some embodiments, when generating a PSP 215 to estimate and optimize QoE, a single PSP 215 can be estimated from multiple stored PSPs 215 or selected that closely matches other identified attributes (e.g., location, demographic, viewing device make/model, screen size, etc.). For example, when the electronic computing device detects a change in user 135, environment 130, and/or playback device 210 and the user 135 elects not to participate in a new test measurement session, the electronic computing device may generate an estimated PSP 215 based on multiple stored PSPs 215 with a similar user 135, environment 130, and/or playback device 210.

In use cases where multiple viewers are present (each having a unique or unknown PSP) for a single playback system 210, (e.g., a television at a home with multiple users/viewers), the electronic computing device may select a single PSP 215 based on many different criteria. For example, if the goal of the system 600 is to minimize the risk of perceived QoE degradation to any users, the electronic computing device may select the most sensitive PSP 215 from among the group of PSPs 215 corresponding to each of the multiple viewers. In this example, the electronic computing device attempts to ensure that even the most sensitive user viewing the display 730 does not experience a decrease QoE. Assuming that the most sensitive user does not experience a decrease in QoE, it follows that less sensitive users viewing the same display 730 would also not experience a decrease in QoE because they are less sensitive to changes in image/video quality than the most sensitive user. In some embodiments, the system 600 may reduce the number of PSP candidates for a given playback system 210 (e.g., a television at a home with multiple users/viewers) based on user presence information, for example, fetched from other applications (e.g., smart home applications) or GPS information of personal mobile devices.

At block 925, the electronic computing device determines whether it has gathered enough information to complete a personalized sensitivity profile (PSP) 215. As explained above, this information may be gathered from current user responses 220 to current test media 225 (at block 920) and/or may be retrieved from previously stored PSPs 215 (at block 910). In FIG. 9, block 910 is shown in dashed lines to indicate that block 910 is optional and may not be performed in some implementations of the method 900. In other words, in some situations, the electronic computing device may generate the PSP 215 (at block 930) based on the received user responses 220 to test media 225 without retrieving previously stored PSPs 215.

Conversely, although blocks 915, 920, and 925 are not shown in dashed lines in FIG. 9, in some situations, blocks 915, 920, and 925 may not be performed by the electronic computing device. In other words, the electronic computing device may not engage in a test measurement session in some situations and may instead rely solely on one or more stored PSPs 215 to generate the PSP 215 used for the current media session. For example, upon retrieving stored PSPs 215 of the user 135 and or the environment 130 (at block 910), the electronic computing device may determine that one of the stored PSPs 215 corresponds to the user 135, the environment 130, and the playback device 210. Accordingly, at block 930, the electronic computing device may utilize the corresponding previously-stored PSP 215 as the PSP 215 for the current media session of the user 135 on the playback device 210 in the environment 130. In this situation, there is no need for the electronic computing device to engage in a test measurement session because the viewing characteristics of the current media delivery session were previously stored in a PSP 215 during a previous test measurement session.

As another example of the electronic computing device not engaging in a test measurement session (i.e., not performing blocks 915, 920, and 925 of FIG. 9), as explained above, when the electronic computing device detects a change in user 135, environment 130, and/or playback device 210 and the user 135 elects not to participate in a new test measurement session, the electronic computing device may generate an estimated PSP 215 based on multiple stored PSPs 215 with a similar user 135, environment 130, and/or playback device 210. For example, if a stored PSP 215 is associated with the same user, the electronic computing device may adjust one or more characteristics of the stored PSP 215 based on a known change in display size or other display characteristics between the playback system 210 associated with the stored PSP 215 and the playback system 210 currently being used by the user 135. Similarly, the electronic computing device may adjust one or more characteristics of the stored PSP 215 based on a known change in the environment of the user 135. For example, based on sensor data from environmental sensors 305, the electronic computing device may determine that the current environment 130 is darker than the environment 130 associated with the stored PSP 215. In other embodiments, instead of generating an estimated PSP 215, the electronic computing device may retrieve and use a stored PSP 215 that includes similar characteristics as the determined and/or known characteristics of the user 135, the environment 130, and/or the playback device 210. For example, the electronic computing device may retrieve a stored PSP 215 of the user 135 even though the stored PSP 215 is for a different environment 130 and/or for a different playback system 210.

Returning back to the explanation of block 925, when the electronic computing device determines that more information is desired to complete the PSP 215 (e.g., to more accurately complete a CSF as shown in FIGS. 5, 11A, and 11B), the method 900 proceeds back to block 915 to continue outputting test media 225 and receiving user inputs (i.e., user responses 220) in response to the test media 225. When the electronic computing device determines that it has gathered enough information to complete the PSP 215, the method proceeds to block 930.

At block 930, the electronic computing device generates a personalized sensitivity profile (PSP) of one or more viewing characteristics of the user based on the user input. For example, the electronic computing device generates a personalized CSF 520 that is translated and/or scaled from an ideal CSF 515 as shown in FIG. 5. Additionally or alternatively, algorithms used to determine streaming parameters, such as the ABR request 140 (or a request with respect to another media delivery method), may have coefficients adjusted and stored in the PSP 215. In some embodiments, the electronic computing device generates a personalized ABR ladder (or another personalized media delivery method) to be included in the PSP 215.

At block 935, the electronic computing device determines, based at least in part on the PSP 215, a media parameter. For example, the electronic computing device determines a value of a media parameter (e.g., a value of one or more of a segment size, a bit rate, a resolution, a frame rate, another media parameter that affects operation of a video encoder/transcoder/transrater associated with the media server 105 and/or the network 115, etc.) At block 940, the media server 105 provides, over the network 115, output media to the playback system 210 in accordance with the media parameter. The output media is configured to be output with the playback system 210 (e.g., an image/video configured to be output on the display 730 of the playback system 210).

To determine the media parameter (i.e., a value of the media parameter) at block 935, the electronic computing device may perform a transform of a generic objective ABR logic model into a personalized objective ABR logic model (POM 405) as shown in FIG. 4 and described previously herein with respect to FIG. 4. In some embodiments, the POM 405 may be implemented within a streaming system supporting adaptive bit rate delivery such as a television, a Set-top-box, a Digital Media Adapter, or a mobile device as shown in FIG. 6. In this example, the POM 405 is utilized by the ABR request logic 140 of the playback system 210 to improve the selection of encoded video and/or audio segments based on, but not limited to, segment size, bit rate, resolution, frame rate, codec, etc. to match, or provide the closest match among the available encoded segments to a PSP 215 of the user 135. For example, algorithms that define the generic objective ABR logic model (or another generic media delivery method) that are used to determine streaming parameters, such as the ABR request 140 (or a request with respect to another media delivery method), may have their coefficients adjusted/personalized in accordance with information stored in the PSP 215.

As described previously herein, the ABR Ladder 137 in FIG. 6 represents a collection of available audio and video segments across a range of bit rates, resolutions, frame rates, etc. Also as explained previously herein, existing media delivery systems/methods (whether ABR-enabled or otherwise) are inefficient and often lead to the playback system 210 requesting more data than it needs for seamless playback and/or requesting values of media parameters (e.g., a resolution/bit rate/frame rate combination) that exceed a PSP 215 of the user 135. In other words, existing media delivery logic attempting to increase the delivered resolution/bit rate/frame rate beyond a sensitivity threshold(s) of the user 135 will not translate to increased QoE for the user 135. The disclosed POM-based media delivery method translates to more efficient delivery and therefore a reduction in delivery costs for an over-the-top (OTT) service as these services pay per Gigabyte egressed from their content delivery network (CDN) vendors.

In some embodiments, at block 935, the electronic computing device selects values of one or more media parameters (e.g., a resolution/bit rate/frame rate combination) that results in streamed media that is within the range of sensitivity perception of the user 135. For example, the electronic computing device may use the CSF 1125 of FIG. 11A to control ABR requests 140 to the media server 105 to request a resolution of streamed media at approximately 720p because the CSF 1125 indicates that the sensitivity peak 1110 of a first user is at approximately 720p. On the other hand, the electronic computing device may use the CSF 1170 of FIG. 11B to control ABR requests 140 to the media server 105 to request a resolution of streamed media at a lower resolution of approximately 540p because the CSF 1170 indicates that the sensitivity peak 1175 of a second user is at approximately 540p. In the two immediately above examples, a first media parameter (i.e., 540p resolution) and a second media parameter (i.e., 720p resolution) are determined such that providing of first output media to a first playback device 210 of the second user decreases a first usage of resources of the network 115 to be lower than a second usage of resources of the network 115 with respect to providing of second output media to a second playback device 210 of the first user. Nevertheless, despite this difference in usage of resources when streaming output media to the two playback devices 210, a first percentage of a first personalized QoE of the first user is maintained at approximately the same level as a second percentage of a second personalized QoE of the second user (see FIG. 12B and Table 1B).

Although the method 900 is described above with respect to a media session of a single playback system 210 or of two playback systems 210, in some embodiments, the method 900 may be performed with respect to additional playback systems 210. For example, the method 900 may be used to determine a PSP 215 for each of a plurality of playback systems 210 that are receiving media streams from a particular node on the network 115. The electronic computing device may improve/optimize one or more media parameters (e.g., coding and delivery parameters) of each media stream being provided to each of the plurality of playback systems 210 to improve/optimize the media streams in aggregate/as a whole from the network 115.

Figure 12A:
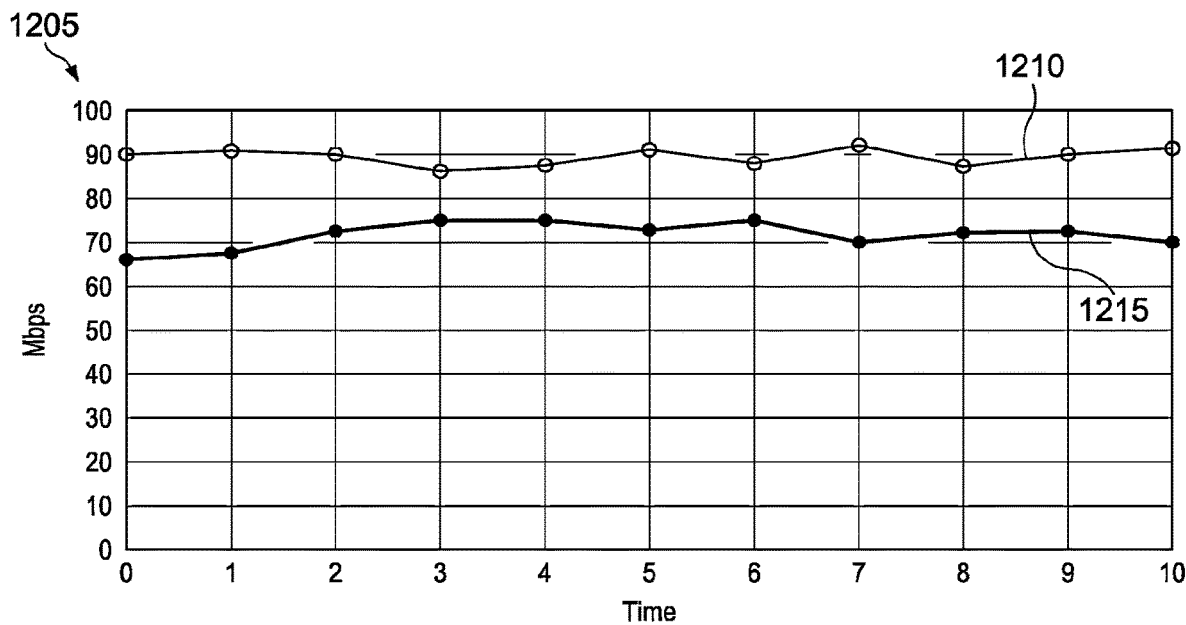
FIGS. 12A and 12B illustrate example bandwidth of a network when using an existing streaming method to stream media versus using the method of FIG. 9 to stream media according to embodiments described herein.
Figure 12B:
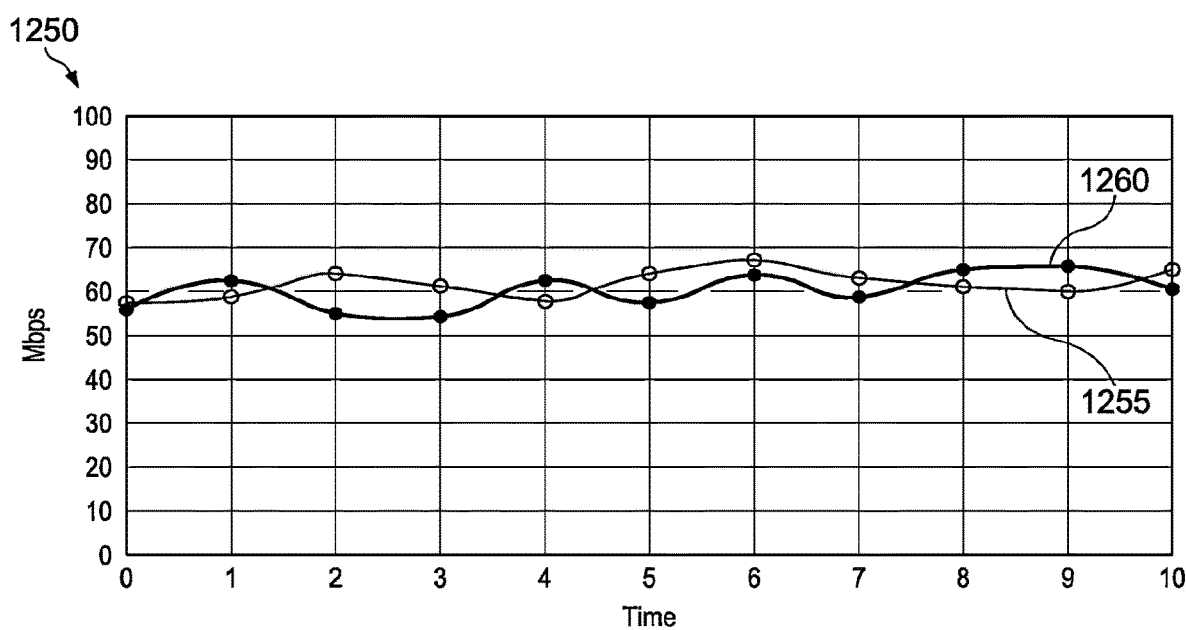

For example, for mobile wireless and broadband network operators, the disclosed POM-based media delivery and coding method 900 can be leveraged to add additional capacity to existing access networks without trading off end user/viewer QoE. In some embodiments, the method 900 provides network operators with a new method to reduce the rate of capital investment necessary to increase network capacity. FIGS. 12A and 12B and tables 1A and 1B illustrate example bandwidth and QoE statistics of the network 115 when using an existing streaming method to stream media versus using the method 900 to stream media. A server using an existing method is referred to as an existing server while a server using the method 900 is referred to as an xCD server (i.e., an Experience Coding and Delivery server).

FIG. 12A illustrates a chart 1205 for a network with an uncapped bandwidth. The upper curve 1210 represents a bandwidth used by media streamed by an existing server. The lower curve 1215 represents a bandwidth used by media streamed by an xCD server using the method 900. As shown in FIG. 12A, the bandwidth used by the media streamed by the xCD server using the method 900 is approximately 20% less than the bandwidth used by the same media streamed by the existing server. Additionally, as indicated by below Table 1A that corresponds to FIG. 12A, the QoE of all viewers (e.g., both high sensitivity users [i.e., close viewers] and low sensitivity users [i.e., far viewers]) remains at 100% (i.e., perfect QoE).

TABLE 1A

| QoE - Existing Server | | QoE xCD Server | |
| --- | --- | --- | --- |
| Ten closest users | Ten farthest users | Ten closest users | Ten farthest users |
| 100% | 100% | 100% | 100% |

As indicated by FIG. 12A and Table 1A, the method 900 results in more efficient media delivery without reducing user QoE for a population of users that each receive a unicast session based on their respective PSP 215. This increase in efficiency and decrease in bandwidth without reducing user QoE is a result of the system 600 reducing the bit rate, resolution, etc. of streamed media based on a PSP 215 of a user 135 who does not experience increased QoE when the bit rate, resolution, etc. increases beyond a certain point. In other words, in some embodiments, the method 900 may aim to deliver the highest perceptible quality of media to each user without delivering higher quality media to any specific user than can be perceived by the specific user (i.e., personalized media content delivery).

FIG. 12B illustrates a chart 1250 for a network with a capped bandwidth/fixed network capacity (e.g., approximately 60 Mbps). The curve 1255 represents a bandwidth used by media streamed by an existing server. The curve 1260 represents a bandwidth used by media streamed by an xCD server using the method 900. Unlike the curves of FIG. 12A, the curves 1255 and 1260 of FIG. 12B use approximately the same bandwidth over time. In some embodiments, the bandwidth used by the media streamed by the xCD server using the method 900 may be approximately 1% less than the bandwidth used by the same media streamed by the existing server. However, as indicated by below Table 1B that corresponds to FIG. 12B, use of the method 900 by the xCD server over a fixed-capacity network link yields a more uniform reduction in QoE across high and low sensitivity users compared to the existing server that implements a traditional ABR segment selection approach.

TABLE 1B

| QoE - Existing Server | | QoE xCD Server | |
| --- | --- | --- | --- |
| Ten closest users | Ten farthest users | Ten closest users | Ten farthest users |
| 60.7% | 82.7% | 80.2% | 78.4% |

For example, Table 1B indicates that high sensitivity users (i.e., the closest users to their respective playback systems 210) experience approximately a 40% reduction in QoE in the capped bandwidth network when media is streamed by the existing server. Comparatively, the low sensitivity users (i.e., the farthest users from their respective playback systems 210) experience only approximately a 20% reduction in QoE in the capped bandwidth network when media is streamed by the existing server. This difference in reduction of QoE is caused by the existing server reducing streaming quality for all users in an equal manner even though changes in streaming quality affect different users differently.

On the other hand, because the user PSPs 215 are used by the xCD server to more intelligently reduce streaming quality in a different manner for different users, the same capped bandwidth network is able to provide more uniform reduction in QoE between all users of the system 600. In some embodiments, the more uniform reduction in QoE results in a higher overall QoE for the users of the system 600. For example, Table 1B indicates that high sensitivity users (i.e., the closest users to their respective playback systems 210) experience only approximately a 20% reduction in QoE in the capped bandwidth network when media is streamed by the xCD server. Similarly, the low sensitivity users (i.e., the farthest users from their respective playback systems 210) experience only approximately a 20% reduction in QoE in the capped bandwidth network when media is streamed by the xCD server. In other words, as indicated by Table 1B, the xCD server implementing the method 900 may significantly improve the QoE of the high sensitivity users while only moderately reducing or maintaining the QoE of the low sensitivity users.

Figure 13A:
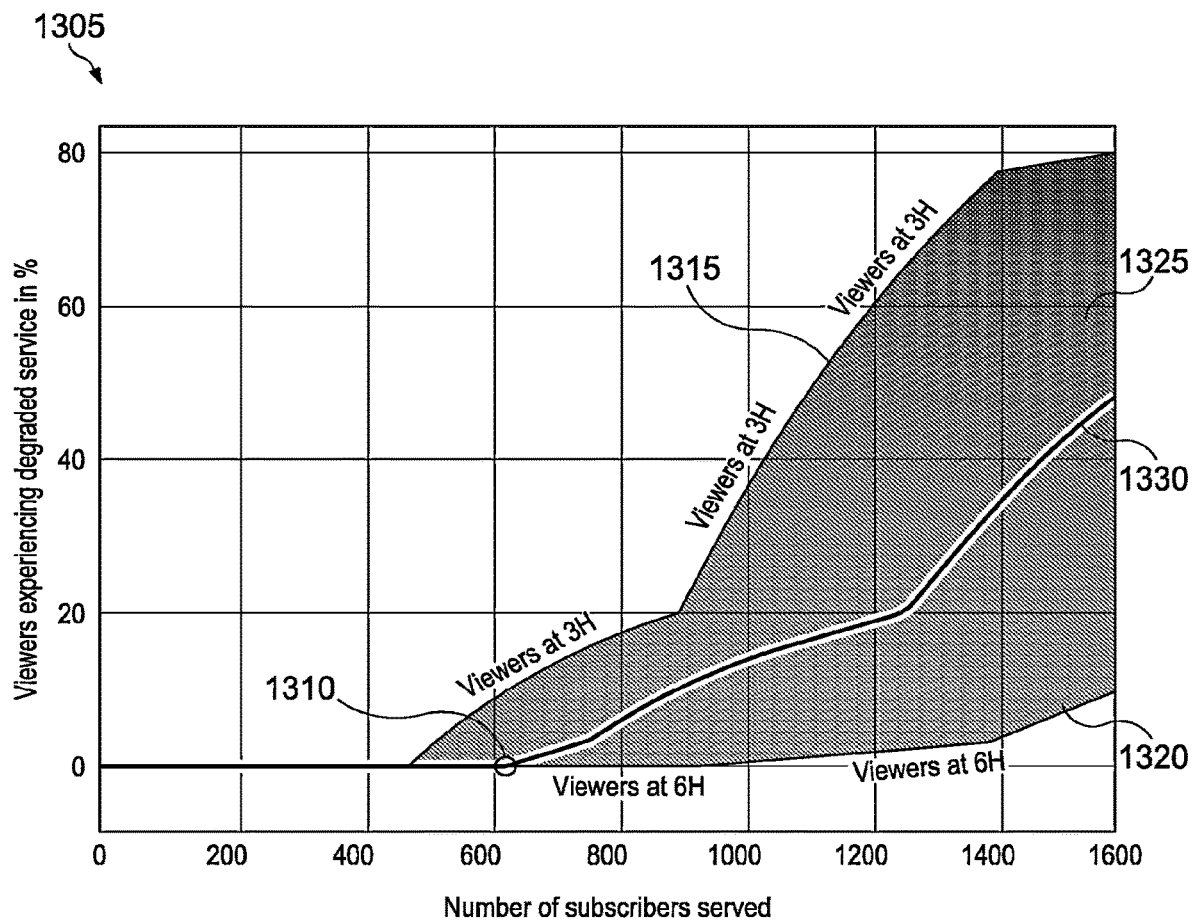
FIGS. 13A and 13B illustrate another example of how the method of FIG. 9 may allow more users/subscribers to stream media on a fixed-capacity network without negatively impacting QoE according to embodiments described herein.
Figure 13B:
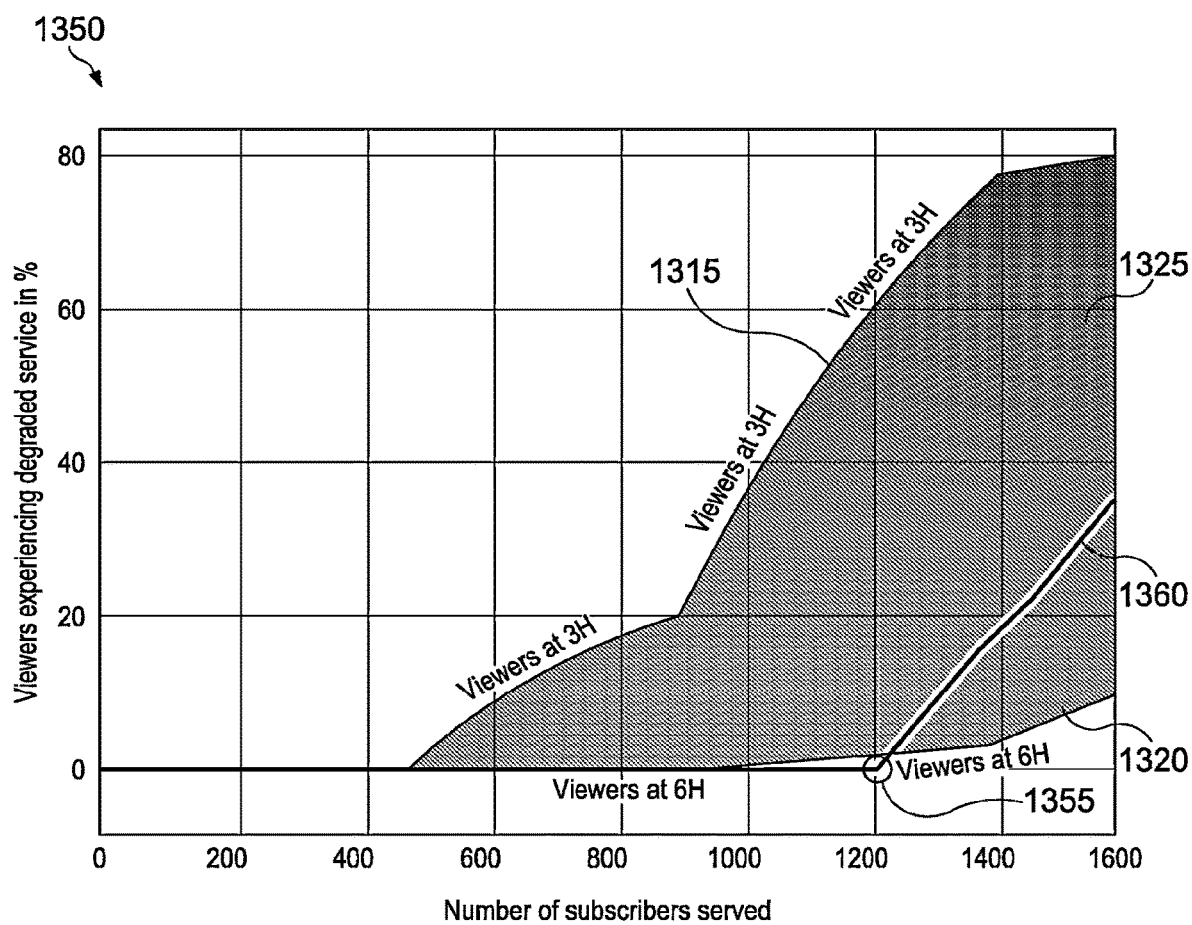

FIGS. 13A and 13B illustrate another example of how the method 900 may allow more users/subscribers to stream media on a fixed-capacity network without negatively impacting QoE. FIGS. 13A and 13B show example graphs 1305 and 1350 of a number of subcribers served (x-axis) versus a percentage of subscribers experiencing reduced QoE (y-axis) using a 1.89 Gbit/s (4096-QAM) fixed-capacity network with an 88% effective throughput after accounting for overhead. The graphs 1305, 1350 of FIGS. 13A and 13B assume a 50% split between viewers with high sensitivity (e.g., three picture heights [3H] away from their respective playback system 210) and low sensitivity (e.g., six picture heights [6H] away from their respective playback system 210).

The graphs 1305, 1350 demonstrate that as users/subscribers are added to the fixed capacity network, video resolution (as an example) must be downgraded once the number of users/subscribers reaches a certain threshold 1310, 1355. However, similar to the above example with respect to FIGS. 12A and 12B and Tables 1A and 1B, downgrading the resolution of all users/subscribers equally (as shown in FIG. 13A) results in unequal QoE depending on whether users/subscribers are watching at 3H or at 6H. For example, the users watching at 3H generally perceive a larger decrease in QoE than the users watching at 6H when the same reduction in resolution is implemented on all media streams. This difference in QoE reduction between different types of users is illustrated by the 3H curve 1315 and the 6H curve 1320 shown in FIGS. 13A and 13B. A shaded area 1325 between the 3H curve 1315 and the 6H curve 1320 illustrates the inequality of the reduced QoE (i.e., perception of degraded service) between high sensitivity users/subscribers and low sensitivity users/subscribers. For example, for the network to serve 1200 users, the reduction in video quality is visible to 60% of users at 3H (i.e., high sensitvity users), but only to about 2% of users at 6H (i.e., low sensitivity users).

FIG. 13A illustrates a first QoE curve 1330 that indicates the QoE experienced by different users/subscribers when utilizing a streaming management method that adapts video coded bit rate and resolution based on viewing distance of all users/subscribers in the same way. On the other hand, FIG. 13B illustrates a second QoE curve 1360 that indicates the QoE experienced by different users/subscribers when the method 900 of FIG. 9 is used to personalize the downgrade in resolution to different users as additional users are added to the network. As explained above, FIGS. 13A and 13B both assume a 50% split between 3H and 6H viewing distance among the users/subscribers.

Using the method 900, the electronic computing device controlling media parameters understands which users are watching at what distance and how each user's QoE will be affected by a reduction in resolution (e.g., based on information stored in the PSP 215 of each user). Accordingly, the electronic compuitng device executing the method 900 can allocate a bit rate/resolution combination so as to achieve equal average QoE in both groups of users (i.e., high sensitivity users and low sensitivity users). This improvement is illustrated by the difference between the QoE curve 1330 in FIG. 13A and the QoE curve 1360 in FIG. 13B. For example, the threshold 1310 of FIG. 13A at which any user experiences decreased QoE is when the network is serving approximately 600 users. Comparatively, the threshold 1355 of FIG. 13B is approximately doubled to about 1200 users. In other words, the network executing the method 900 can serve approximately double the users that an existing network can serve without any users experiencing decreased QoE.

Returning to FIG. 9, as indicated by the dashed line arrow, in some embodiments, the electronic computing device repeats blocks 935 and 940. Repeating of these blocks may allow for real-time tracking of sensor outputs in the playback environment 130 (e.g., environment sensors 305) and/or the network 115 during media delivery services and corresponding adjusting of the personalized objective model 405 in dynamic/adaptive manners for versatile use cases. For example, the system 600 may determine that a room in which the playback system 210 is located has gotten darker since the user 135 began watching television (e.g., due to the sun setting, due to the user 135 closing shades in the room, etc.). In response to this determination, the system 600 may adjust the personalized objective model 405 by, for example, selecting a different stored PSP 215 that includes an ambient light characteristic that is more similar to that of the now darker room.

As explained previously herein, the ABR ladder 137 and ABR-selection methods referred to herein are merely one example method that can be used by the system 600 to control media delivery from the media server 105 to the playback system 210 over the network 115. In other embodiments, other methods may be used to dynamically adjust video encoder/transcoder/transrater parameters (i.e., media parameters) such as bit rate and/or resolution of encoded media that is being streamed. Similar to the ABR-related methods included in many examples, these other media delivery methods have their media parameters adjusted based on one or more PSPs 215 to optimize media delivery as described herein. In some embodiments, the media delivery methods are upstream media delivery methods implemented by the media server 105 and/or the network 115 (i.e., upstream of the playback system 210).

It is to be understood that the embodiments are not limited in its application to the details of the configuration and arrangement of components set forth herein or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Various features and advantages are set forth in the following claims.

What is claimed is:

1. A method for delivering media to a playback device, the method comprising:
    outputting, by a first playback device and during a first test measurement session, first test media to be viewed by a first user;
    receiving a first user input from the first user, the first user input related to a first perception of the first test media by the first user and indicating a first personalized quality of experience of the first user with respect to the first test media;
    generating, with one or more electronic processors, a first personalized sensitivity profile including one or more viewing characteristics of the first user and/or of an environment in which the first user is viewing the first playback device based on the first user input;
    determining, with the one or more electronic processors and based at least in part on the first personalized sensitivity profile, a first media parameter for increasing an efficiency of media delivery to the first playback device over a network while preserving the first personalized quality of experience of the first user; and
    providing, by a media server over the network, first output media to the first playback device in accordance with the first media parameter, the first output media configured to be output with the first playback device.

2. The method of claim 1, wherein providing the first output media to the first playback device in accordance with the first media parameter results in the network using decreased bandwidth to provide the first output media to the first playback device without reducing the first personalized quality of experience of the first user.

3. The method of claim 1, further comprising:
    outputting, by a second playback device and during a second test measurement session, second test media to be viewed by a second user;
    receiving a second user input from the second user, the second user input related to a second perception of the second test media by the second user and indicating a second personalized quality of experience of the second user with respect to the second test media, wherein the second personalized quality of experience indicates that the second user is more sensitive to decreases in quality of media than the first user of the first playback device;
    generating, with the one or more electronic processors, a second personalized sensitivity profile of one or more viewing characteristics of the second user and/or of an environment in which the second user is viewing the second playback device based on the second user input;
    determining, with the one or more electronic processors, a second media parameter for the second playback device based at least in part on the second personalized sensitivity profile; and
    providing, with the one or more electronic processor and over the network, second output media to the second playback device in accordance with the second media parameter, the second output media configured to be output with the second playback device;
    wherein the first media parameter and the second media parameter are determined such that providing of the first output media to the first playback device decreases a first usage of resources of the network to be lower than a second usage of resources of the network with respect to providing of the second output media to the second playback device; and
    wherein a first percentage of the first personalized quality of experience of the first user is maintained at approximately the same level as a second percentage of the second personalized quality of experience of the second user.

4. The method of claim 3, wherein the one or more electronic processors includes at least one of a first electronic processor of the first playback device, a second electronic processor of the second playback device, and a third electronic processor associated with the network or the media server.

5. The method of claim 1, wherein the first test media includes a plurality of hybrid images and the first user input includes a plurality of user inputs, each of the first user inputs being received in response to a respective hybrid image of the plurality of hybrid images.

6. The method of claim 5, further comprising:
    generating, with the one or more electronic processors, each hybrid image by
        low-pass filtering a first source image to create a low-pass filtered source image,
        high-pass filtering a second source image to create a high-pass filtered source image, and
        overlaying the low-pass filtered source image and the high-pass filtered source image on top of each other to create the hybrid image;
    wherein either the low-pass filtered source image or the high-pass filtered source image is perceived by the first user as dominant depending on the one or more viewing characteristics of the first user and/or of the environment.

7. The method of claim 6, wherein outputting the first test media includes:
    outputting, by the first playback device, a first hybrid image to be viewed by the first user;
    receiving the first user input from the first user, the first user input related to the first perception of the first hybrid image by the first user; and
    outputting, by the first playback device, a second hybrid image to be viewed by the first user, wherein a cutoff frequency of at least one of the low-pass filtering and the high-pass filtering used to create the second hybrid image is based on the first user input related to the first perception of the first hybrid image by the first user.

8. The method of claim 1, wherein outputting the first test media includes:
    retrieving, with the one or more electronic processors and from a memory, a previously-stored personalized sensitivity profile; and generating, with the one or more electronic processors, the first test media based on one or more viewing characteristics included in the previously-stored personalized sensitivity profile.

9. The method of claim 8, wherein retrieving the previously-stored personalized sensitivity profile includes:
determining, with the one or more electronic processors, a characteristic of the first test measurement session including at least one of a characteristic of the first user, a characteristic of the first playback device, and a characteristic of the environment in which the first user is viewing the first playback device; and
identifying, with the one or more electronic processors, the previously-stored personalized sensitivity profile from a plurality of previously stored personalized sensitivity profiles based on the previously-stored personalized sensitivity profile including one or more of the same characteristics as the characteristic of the first test measurement session.

10. The method of claim 1, wherein determining the first media parameter includes:
retrieving, with the one or more electronic processors and from a memory, a generic objective model configured to control media streaming based on at least one of resource availability of the network and playback system parameters;
transforming, with the one or more electronic processors, the generic objective model into a personalized objective model using the first personalized sensitivity profile; and
providing, by the media server over the network, the first output media to the first playback device in accordance with the personalized objective model.

11. The method of claim 10, wherein transforming the generic objective model into the personalized objective model includes at least one of translating and scaling an ideal contrast sensitivity function (CSF) used by the generic objective model to create a personalized CSF based on the first personalized sensitivity profile.

12. The method of claim 1, wherein the one or more viewing characteristics of the first user and/or of the environment include at least one of a viewing distance between the first user and a display of the first playback device, lighting in the environment in which the first user is viewing the display, and vision sensitivity of eyes of the first user.

13. The method of claim 1, further comprising:
determining, with an environmental sensor in the environment where the playback device is located, an environmental condition;
wherein generating the first personalized sensitivity profile including the one or more viewing characteristics of the first user and/or the environment includes generating, with the one or more electronic processors, the first personalized sensitivity profile such that first sensitivity profile includes the environmental condition.

14. The method of claim 1, wherein the first test media includes a hybrid image, and wherein the method further comprises:
determining, with the one or more electronic processors, a first value of a media parameter supported by the media server and the network;
determining, with the one or more electronic processors, a second value of the media parameter supported by the media server and the network;
at least one of generating and selecting, with the one or more electronic processors, the hybrid image based on the first value of the media parameter and the second value of the media parameter such that the hybrid image includes a first interpretation corresponding to the first value of the media parameter and a second interpretation corresponding to the second value of the media parameter; and
displaying, on a display of the playback device, the hybrid image.

15. The method of claim 14, wherein the media parameter includes at least one of a video resolution, a bit rate, and a frame rate of media streaming from the media server over the network.

16. An electronic computing device comprising:
a first playback device including a display, wherein the display is configured to output media to a first user; and
one or more electronic processors communicatively coupled to the display, the one or more electronic processors configured to
output, by the first playback device and during a first test measurement session, first test media to be viewed by the first user,
receive a first user input from the first user, wherein the first user input is related to a first perception of the first test media by the first user and indicates a first personalized quality of experience of the first user with respect to the first test media,
generate a first personalized sensitivity profile including one or more viewing characteristics of the first user and/or an environment in which the first user is viewing the first playback device based on the first user input,
determine, based at least in part on the first personalized sensitivity profile, a first media parameter for increasing an efficiency of media delivery to the first playback device over a network while preserving the first personalized quality of experience of the first user, and
provide, by a media server over the network, first output media to the first playback device in accordance with the first media parameter, wherein the first output media is configured to be output with the first playback device.

17. The electronic computing device of claim 16, wherein the one or more electronic processors include at least one of a first electronic processor of the first playback device and a second electronic processor associated with the network or the media server.

18. The electronic computing device of claim 16, wherein the first test media includes a plurality of hybrid images and the first user input includes a plurality of user inputs, each of the first user inputs being received in response to a respective hybrid image of the plurality of hybrid images.

19. The electronic computing device of claim 16, wherein the one or more electronic processors is configured to determine the first media parameter by:
retrieving, with the one or more electronic processors and from a memory, a generic objective model configured to control media streaming based on at least one of resource availability of the network and playback system parameters;
transforming, with the one or more electronic processors, the generic objective model into a personalized objective model using the first personalized sensitivity profile; and
providing, by the media server over the network, the first output media to the first playback device in accordance with the personalized objective model.

20. The electronic computing device of claim 16, wherein the first test media includes a hybrid image, and wherein the one or more electronic processors are configured to:
- determine a first value of a media parameter supported by the media server and the network;
- determine a second value of the media parameter supported by the media server and the network;
- at least one of generate and select the hybrid image based on the first value of the media parameter and the second value of the media parameter such that the hybrid image includes a first interpretation corresponding to the first value of the media parameter and a second interpretation corresponding to the second value of the media parameter; and
- display, on a display of the playback device, the hybrid image.

21. The electronic computing device of claim 20, wherein the media parameter includes at least one of a video resolution, a bit rate, and a frame rate of media streaming from the media server over the network.

* * * * *